United States Patent
Tamaki et al.

(10) Patent No.: US 11,232,331 B2
(45) Date of Patent: Jan. 25, 2022

(54) NON-TRANSITORY COMPUTER-READABLE MEDIUM STORING PRETREATMENT INFORMATION GENERATION PROGRAM FOR GENERATING PRETREATMENT INFORMATION WITH RESPECT TO IMAGE DATA

(71) Applicant: BROTHER KOGYO KABUSHIKI KAISHA, Nagoya (JP)

(72) Inventors: Shuichi Tamaki, Nagoya (JP); Takeshi Watanabe, Nagoya (JP); Kenji Sato, Yokkaichi (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 16/141,416

(22) Filed: Sep. 25, 2018

(65) Prior Publication Data
US 2019/0197370 A1    Jun. 27, 2019

(30) Foreign Application Priority Data
Dec. 27, 2017 (JP) .............................. JP2017-252373

(51) Int. Cl.
*G06K 15/02* (2006.01)
*G06K 15/00* (2006.01)

(52) U.S. Cl.
CPC ......... *G06K 15/021* (2013.01); *G06K 15/005* (2013.01); *G06K 15/4065* (2013.01); *G06K 2215/0097* (2013.01)

(58) Field of Classification Search
None
See application file for complete search history.

(56) References Cited

U.S. PATENT DOCUMENTS 9,465,563 B2 * 10/2016 Kawaguchi .......... B41J 11/0095
9,550,374 B1    1/2017 Marino et al.
(Continued)

FOREIGN PATENT DOCUMENTS

JP    2001094767 A    4/2001
JP    2012207338 A    10/2012
(Continued)

OTHER PUBLICATIONS

New U.S. patent application claiming priority to JP Application No. 2017-252361 being filed concurrently on Sep. 25, 2018 (56 pages).
(Continued)

*Primary Examiner* — Mohammad H Ghayour
*Assistant Examiner* — Pawan Dhingra
(74) *Attorney, Agent, or Firm* — K&L Gates LLP

(57) ABSTRACT

A non-transitory computer-readable medium stores computer-readable instructions. The computer-readable instructions are executed by a processor of a pretreatment information generation device that generates pretreatment information to be used in pretreatment on a recording medium by a pretreatment device. The computer-readable instructions that, when executed by the processor, perform processes including receiving image data to be printed on the recording medium, and identifying the pretreatment information to perform the pretreatment with respect to the received image data.

14 Claims, 20 Drawing Sheets

(56) References Cited

U.S. PATENT DOCUMENTS

| | | | |
|---|---|---|---|
| 2005/0243121 A1* | 11/2005 | Onishi | B41J 11/42 |
| | | | 347/21 |
| 2006/0214984 A1* | 9/2006 | Hirakawa | B41J 11/0015 |
| | | | 347/31 |
| 2006/0275066 A1* | 12/2006 | Mima | B41J 11/009 |
| | | | 400/76 |
| 2008/0016090 A1* | 1/2008 | Fukata | G06F 3/1285 |
| 2013/0265359 A1* | 10/2013 | Sugaya | B41J 13/223 |
| | | | 347/16 |
| 2015/0044372 A1 | 2/2015 | Okada et al. | |
| 2017/0151810 A1* | 6/2017 | Kamibayashi | B41J 11/009 |
| 2017/0283637 A1 | 10/2017 | Sakai | |

FOREIGN PATENT DOCUMENTS

| | | |
|---|---|---|
| JP | 2013-019083 A | 1/2013 |
| JP | 2015068947 A | 4/2015 |
| JP | 2016086444 A | 5/2016 |
| JP | 2017030232 A | 2/2017 |
| JP | 2017179263 A | 10/2017 |

OTHER PUBLICATIONS

Non-Final Office Action issued in connection with related U.S. Appl. No. 16/141,376, dated Sep. 20, 2019. (11 pages).
Advisory Action dated Aug. 5, 2020 in corresponding U.S. Appl. No. 16/141,376.
Final Office Action dated Mar. 3, 2020 in corresponding U.S. Appl. No. 16/141,376.
Japanese Office Action dated Sep. 21, 2021 in corresponding Japanese Patent Application No. 2017-252373.

* cited by examiner

FIG. 5

MANUFACTURING INFORMATION

<MANUFACTURER>
- MK1
- MK2
- ⋮

<BRAND>
- BR1
- BR2
- ⋮

<MODEL NUMBER>
- TN1
- TN2
- ⋮

<LOT>
- RT1
- RT2
- ⋮

○ MANUAL SETTING

<APPLICATION AMOUNT PER UNIT AREA>

C4   mg/cm$^2$

<TYPE OF PRETREATMENT AGENT>

L4

<HEAT TREATMENT PRESSURE>

P4   N/cm$^2$

<HEAT TREATMENT TIME PERIOD>

T4   sec

<HEAT TREATMENT TEMPERATURE>

MANUFACTURING INFORMATION

⬤ MANUAL SETTING

<MANUFACTURER>

<APPLICATION AMOUNT PER UNIT AREA>

| C7 | mg/cm² |

<TYPE OF PRETREATMENT AGENT>

| L7 |

<BRAND>

<HEAT TREATMENT PRESSURE>

| P7 | N/cm² |

<MODEL NUMBER>

<HEAT TREATMENT TIME PERIOD>

| T7 | sec |

<HEAT TREATMENT TEMPERATURE>

<LOT>

| TP7 | °C |

| IDENTIFIER | IMAGE DATA | PRETREATMENT INFORMATION |
|---|---|---|
| ID1 | IMG1 | PRETREATMENT INFORMATION 1 |
| ID2 | IMG2 | PRETREATMENT INFORMATION 2 |
| ID3 | IMG3 | PRETREATMENT INFORMATION 3 |
| ID4 | IMG4 | PRETREATMENT INFORMATION 4 |
| ID5 | IMG5 | PRETREATMENT INFORMATION 5 |
| ID6 | IMG6 | PRETREATMENT INFORMATION 6 |
| ⋮ | ⋮ | ⋮ |

FIG. 8

| SPRAY | (1) | (2) | (3) | (4) | (5) | (6) | (7) |
|---|---|---|---|---|---|---|---|
| APPLICATION SECTION | [0, a] | [a, b] | [b, c] | [c, d] | [d, e] | [e, f] | [f, g] |

FIG. 13

MATERIAL INFORMATION

<FABRIC THICKNESS>

| TH1 |
|---|
| TH2 |
| . |
| . |

<MATERIAL>

| MT1 |
|---|
| MT2 |
| . |
| . |

<KNIT/WEAVE>

| WE1 |
|---|
| WE2 |
| . |
| . |

<COLOR>

| CL1 |
|---|
| CL2 |
| . |
| . |

○ MANUAL SETTING

<APPLICATION AMOUNT PER UNIT AREA>

| C5 | mg/cm² |

<TYPE OF PRETREATMENT AGENT>

| L5 |

<HEAT TREATMENT PRESSURE>

| P5 | N/cm² |

<HEAT TREATMENT TIME PERIOD>

| T5 | sec |

<HEAT TREATMENT TEMPERATURE>

| TP5 | °C |

MATERIAL INFORMATION ● MANUAL SETTING

<FABRIC THICKNESS>

<APPLICATION AMOUNT PER UNIT AREA>

C8 mg/cm²

<TYPE OF PRETREATMENT AGENT>

L8

<MATERIAL>

<HEAT TREATMENT PRESSURE>

P8 N/cm²

<KNIT/WEAVE>

<HEAT TREATMENT TIME PERIOD>

T8 sec

<HEAT TREATMENT TEMPERATURE>

<COLOR>

TP8 °C

OK

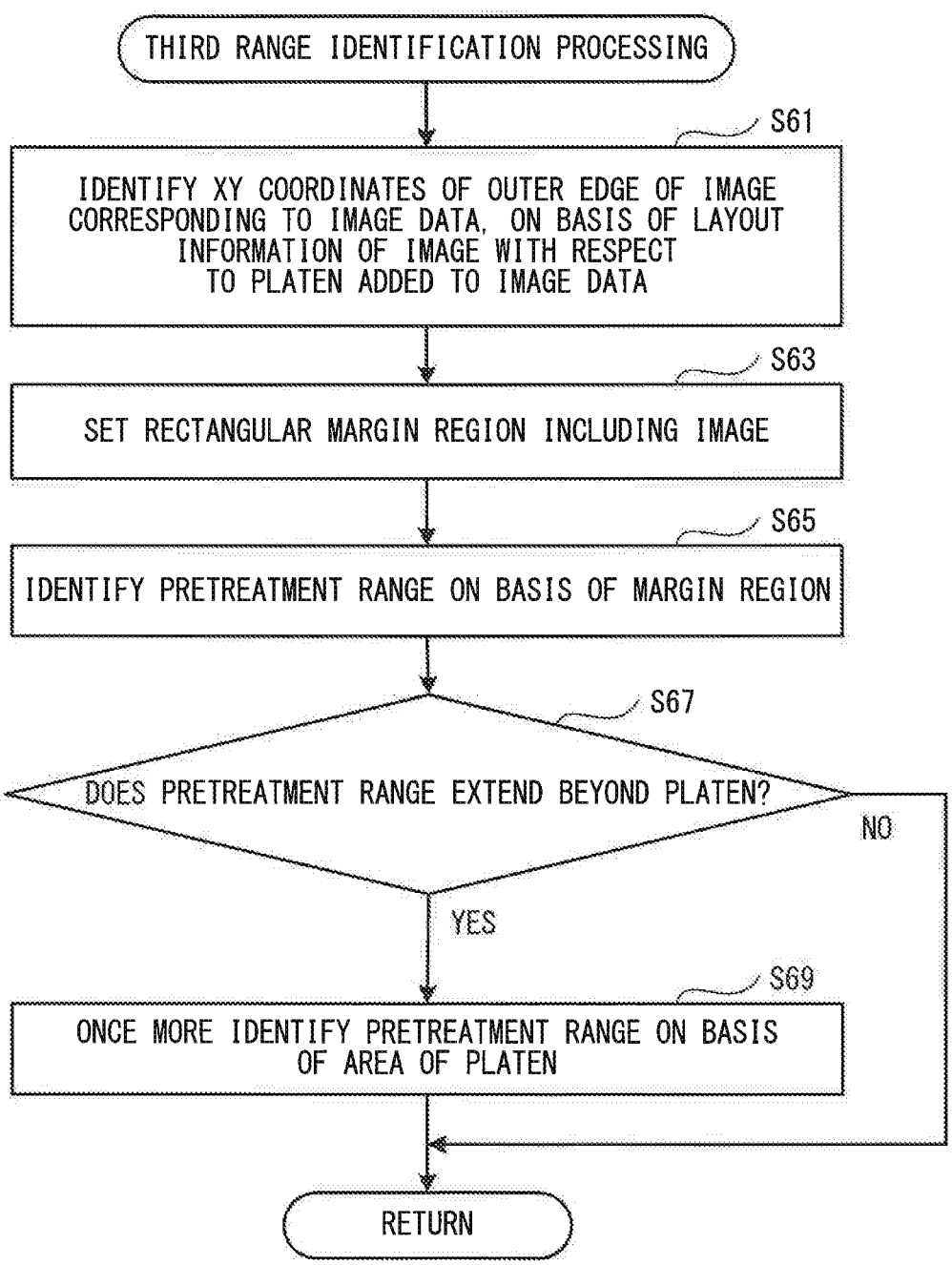

NON-TRANSITORY COMPUTER-READABLE MEDIUM STORING PRETREATMENT INFORMATION GENERATION PROGRAM FOR GENERATING PRETREATMENT INFORMATION WITH RESPECT TO IMAGE DATA

CROSS-REFERENCE TO RELATED APPLICATION

This application claims priority to Japanese Patent Application No. 2017-252373 filed Dec. 27, 2017. The contents of the foregoing application are hereby incorporated herein by reference.

BACKGROUND

The present disclosure relates to a non-transitory computer-readable medium storing a pretreatment information generation program, a pretreatment information generation method, and a pretreatment information generation device.

An inkjet textile printer is known that performs pretreatment before print processing. The inkjet textile printer is provided with a textile printing execution portion and a pretreatment portion. Before the textile printing execution portion ejects ink onto a material to be printed, the pretreatment portion performs processing to smooth out wrinkles of the material to be printed. Further, the pretreatment portion also performs other processing, such as processing to apply a coating liquid, which is used as a pretreatment agent, onto the material to be printed.

SUMMARY

There is also a case in which the pretreatment portion performs heat treatment in order to fix the pretreatment agent. It is conceivable that, in order to perform the pretreatment, an operator of the pretreatment device specifies each of a plurality of pieces of pretreatment information, such as an application amount per unit area of the pretreatment agent, an application range, a heat treatment time period, a heat treatment temperature and the like, via an operation portion of the pretreatment device or a terminal device connected to the pretreatment device, just before the pretreatment. An example of pretreatment information is an application amount per unit area of the pretreatment agent, an application range, a heat treatment time period, a heat treatment temperature and the like. However, when the pretreatment information is specified just before the pretreatment, there is a possibility that productivity may deteriorate of pretreatment on a material that is to be textile printed.

Embodiments of the broad principles derived herein provide a non-transitory computer-readable medium storing a pretreatment information generation program, a pretreatment information generation method that are capable of reducing a deterioration in productivity of pretreatment of a recording medium, and a pretreatment information generation device.

The embodiments herein provide a non-transitory computer-readable medium storing computer-readable instructions that, when executed by a processor of a pretreatment information generation device that generates pretreatment information to be used in pretreatment on a recording medium by a pretreatment device, perform the following processes including: receiving image data to be printed on the recording medium, and identifying the pretreatment information to perform the pretreatment with respect to the received image data.

The embodiments herein provide a pretreatment information generation method of a pretreatment information generation device that generates pretreatment information to be used in pretreatment on a recording medium by a pretreatment device. The method includes the steps of: receiving, by a control portion of the pretreatment information generation device, image data to be printed on the recording medium; and identifying the pretreatment information to perform the pretreatment with respect to the image data received by the control portion.

The embodiments herein provide a pretreatment information generation device including a reception portion, a processor; and a memory. The reception portion receives image data to be printed on a recording medium. The memory stores computer-readable instructions that, when executed by the processor, perform processes including: receiving image data to be printed on the recording medium; and identifying the pretreatment information to perform the pretreatment with respect to the received image data.

BRIEF DESCRIPTION OF THE DRAWINGS

Embodiments will be described below in detail with reference to the accompanying drawings in which:

FIG. 5 is a diagram showing a first specific example, in an example of a second setting screen;

FIG. 6 is a diagram showing a second specific example, in the example of the second setting screen;

FIG. 7 is diagram showing an example of a first table;

FIG. 8 is an example of a second table;

FIG. 13 is a diagram showing a first specific example, in an example of a third setting screen;

FIG. 14 is a diagram showing a second specific example, in the example of the third setting screen;

FIG. 20 is a flowchart showing a flow of third identification processing.

DETAILED DESCRIPTION

A pretreatment information generation device of the present disclosure will be explained with reference to the drawings. The pretreatment information generation device of a present embodiment will be explained as exemplified by a terminal device 3 to be described later.

System Configuration

Figure 1:
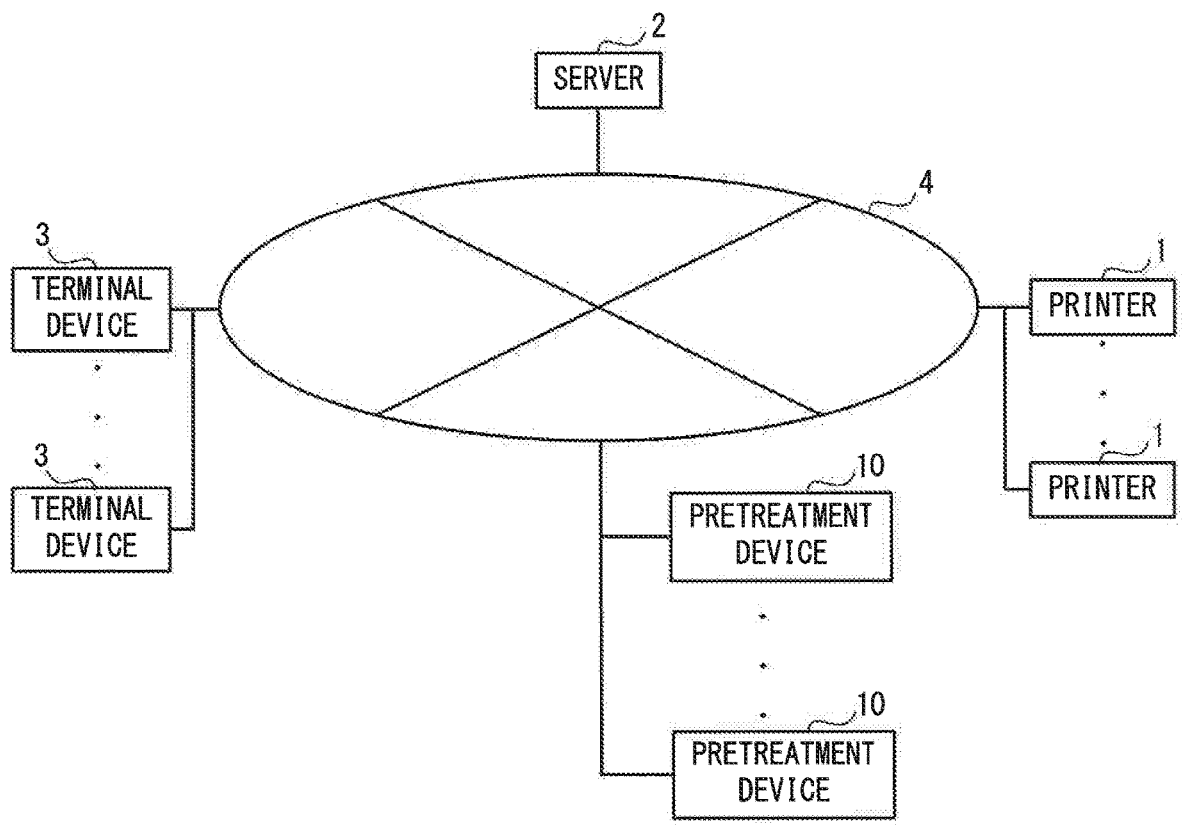
FIG. 1 is a network configuration diagram of a system including a terminal device.

As shown in FIG. 1, one or a plurality of pretreatment devices 10, one or a plurality of printers 1, a server 2, and one or a plurality of terminal devices 3 are connected to each other via a network 4. The printer 1 performs print processing on a cloth, which is an example of a recording medium, on the basis of print data. The print data is information for the printer 1 to perform printing on the cloth. Examples of the network 4 include an intranet and the Internet. Further, the one or the plurality of the pretreatment devices 10, the one or the plurality of the printers 1, the server 2, and the one or the plurality of the terminal devices 3 need not necessarily be each connected to the network 4, and may be connected to each other via, for example, a serial cable that can be connected to a serial port, such as a USB port. Further, the connection via the network 4 and the connection via the serial cable may be mixed.

Pretreatment Device 10

Figure 2:
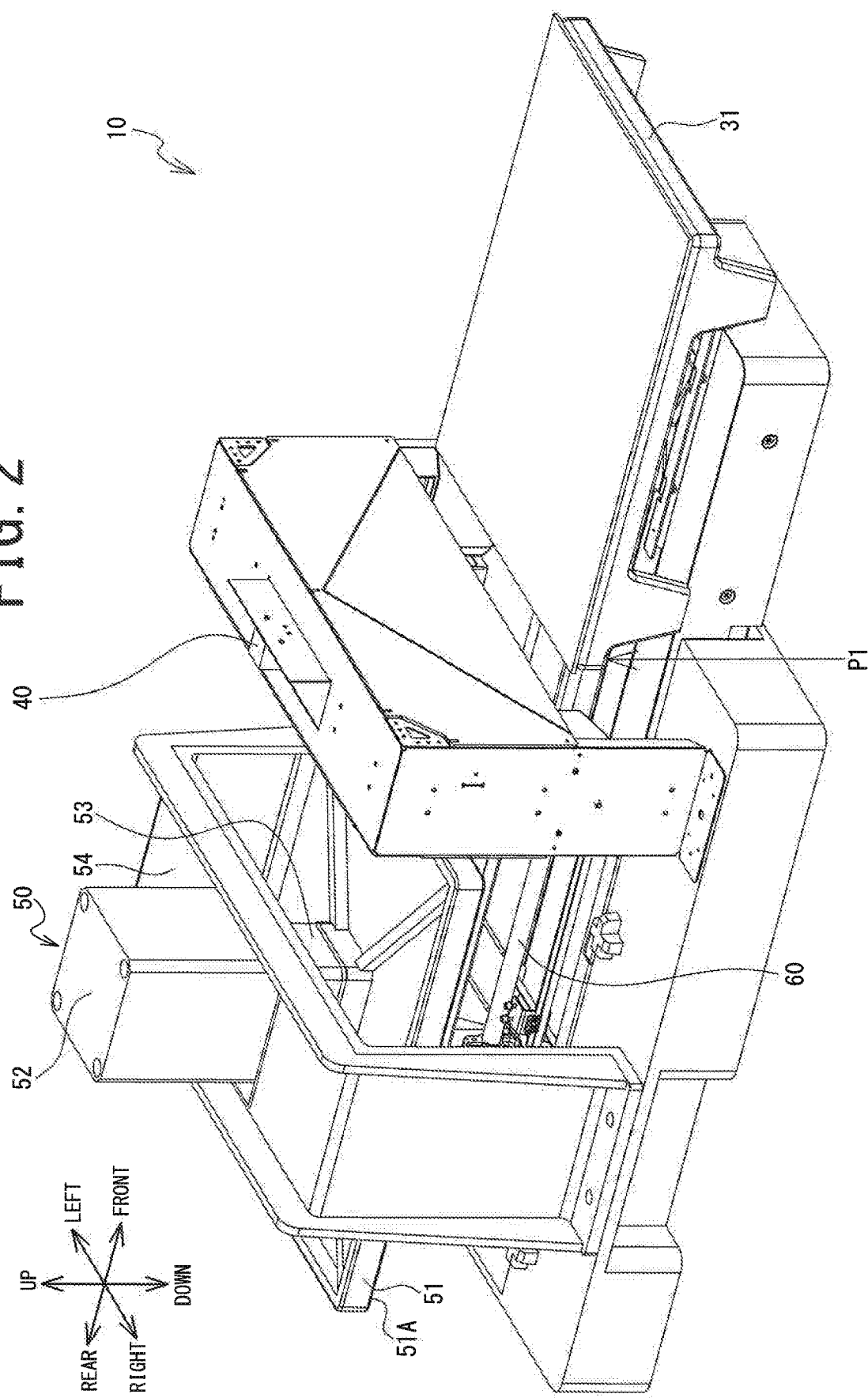
FIG. 2 is a perspective view schematically showing a configuration of the pretreatment device.

The upper side, the lower side, the lower right side, the upper left side, the lower left side and the upper right side of FIG. 2 respectively correspond to the upper side, the lower side, the front side, the rear side, the right side and the left side of the pretreatment device 10. The pretreatment device 10 is a device that performs pretreatment before the printing is performed on the cloth by the printer 1. Examples of the pretreatment include an application treatment of a pretreatment agent onto the cloth, and a high-temperature heat treatment to fix the pretreatment agent onto the cloth. For example, as shown in FIG. 2, the pretreatment device 10 is provided with a platen 31, an application portion 40, a heat treatment portion 50 and the like. The cloth, which is an example of the recording medium, is placed on the platen 31. The application portion 40 applies the pretreatment agent onto the cloth. The heat treatment portion 50 pressurizes the cloth at a high temperature, for example, and dries the pretreatment agent, thus improving the fixing of the pretreatment agent to the cloth and improving image quality. Hereinafter, the application portion 40 and the heat treatment portion 50 are collectively referred to as a "pretreatment portion 70." Examples of a material of the cloth include cotton, polyester, a cotton/polyester mix, and the like. The pretreatment agent improves the color development of color inks. The pretreatment agent is, for example, an aqueous solution containing metal salt, such as $CaCl_2$.

As shown in FIG. 2, a set position P1 of the platen 31 is a position of the platen 31 when an operator places the cloth on the platen 31, and is, for example, a position when the platen 31 is moved to the frontmost side. The platen 31 has a substantially rectangular shape and the upper surface thereof is long in the front-rear direction. Further, a cylindrical coupling portion (not shown in the drawings) is provided at a central portion of the lower surface of the platen 31.

Platen Conveyance Mechanism

The pretreatment device 10 is provided with a platen conveyance mechanism (not shown in the drawings) below the platen 31. The platen conveyance mechanism conveys the platen 31 in the front-rear direction. The platen conveyance mechanism is provided with two guides 60, a belt (not shown in the drawings), a pulley (not shown in the drawings), a support portion (not shown in the drawings), a platen motor (not shown in the drawings) and the like. The two guides 60 extend rearward from a front portion of the pretreatment device 10, and are provided in parallel with each other in the left-right direction. The guides 60 are, for example, columnar metal rods. The platen 31 moves in the front-rear direction along the two guides 60. The platen motor is, for example, a stepping motor.

The support portion supports the platen 31 and is coupled to the coupling portion of the platen 31. Further, the support portion has two insertion holes (not shown in the drawings) into which the two guides 60 are inserted. Thus, when the support portion is moved in the front-rear direction by the belt of the platen conveyance mechanism, the platen 31 moves in the front-rear direction.

Application Portion 40

The application portion 40 is provided with at least one spray (not shown in the drawings), a tank (not shown in the drawings) for the pretreatment agent, a flow path (not shown in the drawings) to supply the pretreatment agent in the tank to the spray, and the like. Further, nozzles (not shown in the drawings) of the spray are each connected to the flow path. When a plurality of the tanks are provided, different types of the pretreatment agent are accumulated in the tanks, respectively. A spraying surface of the spray faces the upper surface of the platen 31. When a detection portion (not shown in the drawings), which will be described in detail later, detects the movement of the platen 31 to an application position (not shown in the drawings), the spray starts to spray the pretreatment agent onto the cloth. The application position is a position at which the application portion 40 starts to apply the pretreatment agent.

Heat Treatment Portion 50

The heat treatment portion 50 is disposed such that it is separated rearward from the application portion 40. Examples of the heat treatment portion 50 include a near-infrared ray heater, an air blowing device that blows high-temperature air, a heat press device, a heat roller and the like. Hereinafter, an explanation will be made assuming that the heat treatment portion 50 is the heat press device. The heat treatment portion 50 is provided with a heat press portion 51, a press surface drive mechanism 52, a coupling portion 53, a press support portion 54 and the like. The press surface drive mechanism 52 is provided with a pulley (not shown in the drawings), a press motor (not shown in the drawings) and the like. The heat press portion 51 is formed in a substantially rectangular shape that is long in the front-rear direction. The lower surface of the heat press portion 51 functions as a press surface 51A.

The heat press portion 51 is internally provided with a heat generation mechanism (not shown in the drawings) that generates heat at a specified temperature, and can be moved up and down by the press surface drive mechanism 52. When the detection portion detects the movement of the platen 31 to a heat treatment position (not shown in the drawings), the press portion 51 is lowered by the press surface drive mechanism 52, and the press surface 51A starts a heat press operation with respect to the cloth. Hereinafter, the position at which the heat treatment portion 50 starts a downward press operation is referred to as the "heat treatment position."

For example, when the platen 31 is positioned at the heat treatment position, the press surface 51A is larger than the upper surface of the platen 31 in four directions (the front-rear and left-right directions). In this case, the pretreatment device 10 can heat press a region of the cloth onto which the pretreatment agent has been applied, at one time.

Electrical Configuration of Terminal Device 3

Figure 3:
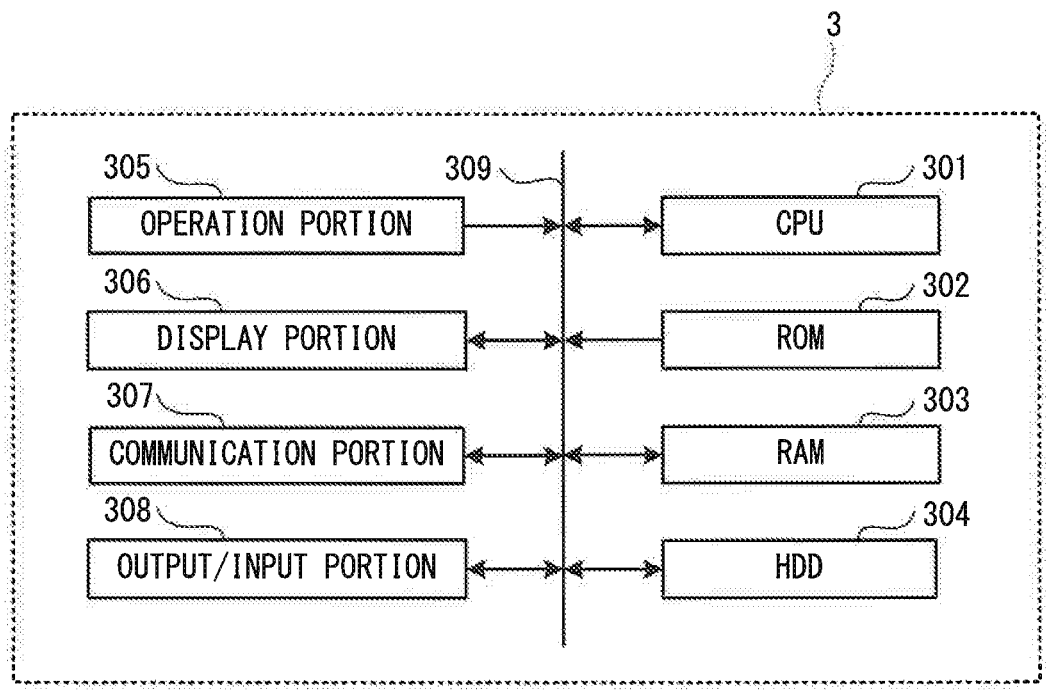
FIG. 3 is a block diagram schematically showing an electrical configuration of the terminal device.

As shown in FIG. 3, the terminal device 3 is provided with a CPU 301, a ROM 302, a RAM 303, an HDD 304, an operation portion 305, a display portion 306, a communication portion 307, an output/input portion 308, and the like. Each configuration of the terminal device 3 is connected to each other via a bus 309. Examples of the terminal device 3 include a personal computer (PC), a smartphone, a tablet and the like.

The CPU 301 performs overall control of the terminal device 3, reads out various programs from the HDD 304, and performs various types of processing using the RAM 303 as a working memory. For example, the CPU 301 reads out a first main processing program, to be described later, from the HDD 304, and performs first main processing.

The HDD 304 stores various programs, such as the first main processing program, a first range identification processing program, and the like, and various information. The HDD 304 stores information of various setting screens, such as a first setting screen 91 and a second setting screen 92 to be described later. The HDD 304 associates and stores divided regions of the platen 31 with XY coordinates of at least the left front ends of each of the divided regions. The HDD 304 stores information as to whether, for each of the connected pretreatment devices 10, the heat treatment portion 50 can perform the heat treatment for each of the regions obtained by dividing the area of the platen 31. The XY coordinates of the platen 31 will be described below. The HDD 304 associates and stores the pretreatment information that does not include the pretreatment range 102, for each piece of manufacturing information that can be set on the second setting screen 92. The HDD 304 stores various tables (correlation information), such as a first table 81 and a second table 82 to be described later. The table is an example of the correlation information, and in the present embodiment, the table is exemplified, but the correlation information can be any desired format.

The operation portion 305 is provided with a keyboard. The keyboard is, for example, provided with buttons or the like. The operator can operate the operation portion 305, and give a desired instruction to the terminal device 3. The display portion 306 is configured by a known display device. The display portion 306 may be provided with a touch panel, and may function as the operation portion 305.

The communication portion 307 has at least one of a wireless module (not shown in the drawings) and a wired module (not shown in the drawings), and can be connected to the pretreatment device 10, the printer 1, and the server 2, via the network 4. The communication portion 307, for example, receives image data sent from an external device, such as the server 2 or another server. When the communication portion 307 receives the image data, the communication portion 307 inputs the received image data to the CPU 301. The terminal device 3 may be connected to the pretreatment portion 10, the printer 1, and the server 2, via the network 4, by the wireless module connectable to a USB port, in place of the communication portion 307.

The output/input portion 308 is provided with a secure digital (SD) memory card slot, a USB port, and the like. The output/input portion 308 receives, for example, the image data from an SD memory card inserted into the SD memory card slot, or an external device and the like connected to the USB port. When the output/input portion 308 receives the image data, the output/input portion 308 inputs the received image data into the CPU 301. Layout information of the pretreatment device 10 with respect to the platen 31 may be added to image data of an image 101 corresponding to the image data.

First Setting Screen 91

Figure 4:
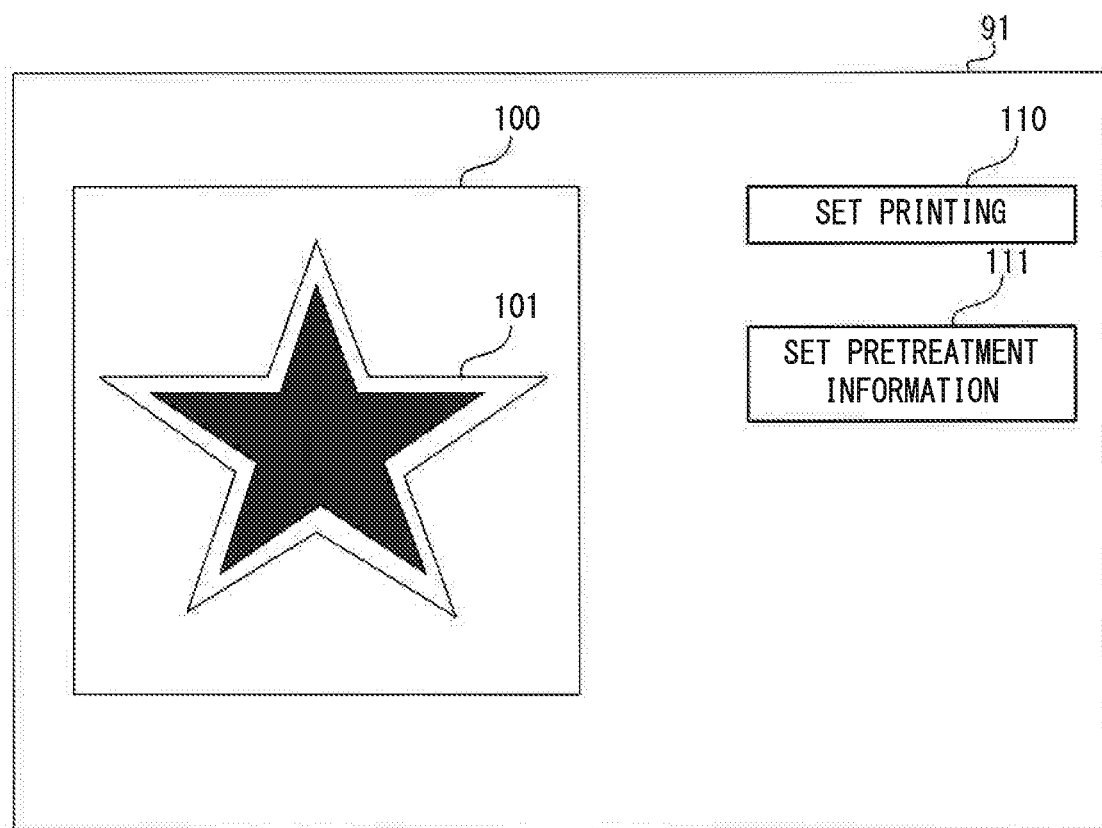
FIG. 4 is a diagram showing an example of a first setting screen.

As shown in FIG. 4, the first setting screen 91 is a setting screen to display, on a screen of the display portion 306, a print setting screen (not shown in the drawings) for setting print information of a number of prints and the like, or a second setting screen 92 (refer to FIG. 5) for setting pretreatment information. A window 100 in the first setting screen 91 is a window to display the image 101 corresponding to the image data received by the communication portion 307 and the like.

When a set printing button 110 is selected by the operator on the first setting screen 91, information indicating that the set printing button 110 has been selected is input into the CPU 301. When the information that the set printing button 110 has been selected is input, the CPU 301 controls the display portion 306 and displays a print setting screen on the screen of the display portion 306. When a set pretreatment information button 111 is selected by the operator on the first setting screen 91, information indicating that the set pretreatment information button 111 has been selected is input into the CPU 301. When the information indicating that the set pretreatment information button 111 has been selected is input, the CPU 301 controls the display portion 306 and displays the second setting screen 92 on the screen of the display portion 306.

Second Setting Screen 92

As shown in FIG. 5, the second setting screen 92 is an example of a setting screen for setting pretreatment information excluding the pretreatment range 102. By the operator selecting each of manufacturing information items displayed on the second setting screen 92, the CPU 301 identifies the pretreatment information corresponding to each item of the selected manufacturing information. Each item of the pretreatment information identified by the CPU 301 is displayed on the right side of the second setting screen 92. By the operator selecting an OK button 112, the pretreatment information is set. The set pretreatment information is input into the CPU 301. The manufacturing information is, for example, a manufacturer, a brand, a model number, and a lot. The manufacturer is information of a manufacturing source of a finished product in which the printing has been performed on the recording medium. Hereinafter the finished product is referred to as a product. The brand is information of a brand developed by the manufacturer. The model number is information of a management number that is assigned to each model of the product. The lot is information of a management number of a manufacturing unit of the product that is used for production management.

The pretreatment information includes an application amount per unit area ($mg/cm^2$), an application range, a type of the pretreatment agent, a heat treatment pressure ($N/cm^2$), a heat treatment time period (sec), a heat treatment temperature (° C.), a heat treatment range, a number of times of the heat treatment, and the like. The application amount per unit area (mg/cm$^2$) is an application amount per unit area (mg/cm$^2$) of the pretreatment agent. The application range is a range over which the pretreatment agent is applied. When the heat treatment portion 50 is a heat press portion, a heat roller or the like that applies a pressure to the cloth that is a heat treatment target, the heat treatment pressure (N/cm$^2$) is a value of the pressure applied to the cloth at the time of the heat treatment. Therefore, when the heat treatment portion 50 is a near-infrared ray heater, an air blowing device or the like that does not come into contact with the cloth, the heat treatment pressure is set to null (−). The heat treatment time period (sec) is a time period during which the heat treatment is performed. The heat treatment temperature (° C.) is a temperature of the heat treatment. The heat treatment range is a range over which the heat treatment is performed. The number of times of the heat treatment is the number of times that the heat treatment of the set heat treatment time period (sec) is repeated.

On the second setting screen 92 of the present embodiment, the pretreatment information corresponding to each item of the selected manufacturing information is automatically set by the selecting of each item of the manufacturing information. FIG. 5 shows, as the manufacturing information, the manufacturer, the brand, the model number, and the lot selected by the operator as MK2, BR1, TN2, and RT2, respectively. In this case, the application amount per unit area (mg/cm2), the type of the pretreatment agent, the heat treatment pressure (N/cm$^2$), the heat treatment time period (sec), the heat treatment temperature (° C.) and the like of the set pretreatment information are respectively denoted by C4, L4, P4, T4, and TP4.

Further, the second setting screen 92 of the present embodiment can directly specify the pretreatment information. FIG. 6 shows an example of a case in which the pretreatment information is directly specified. When directly specifying pretreatment information, the operator selects a manual setting on the second setting screen 92. By selecting the manual setting, a desired value or a desired type of the pre-treatment agent can be input into a column of each item of the pretreatment information. After the operator has input the desired value or the desired type of the pretreatment agent into the column of each item of the pretreatment information, when the operator selects the OK button 112, the input pretreatment information is set. The set pretreatment information is input into the CPU 301.

First Table 81

As shown in FIG. 7, the first table 81 is a table in which identifiers, image data, and pretreatment information including the pretreatment range 102 are associated with each other. The identifier is information of a unique identification symbol, such as a random number or the like generated by the CPU 301, for example. The image data is image data received by the communication portion 307 or the output/input portion 308. The pretreatment information is described above and an explanation thereof is therefore omitted here. Note that the pretreatment range 102 is information of a range over which the pretreatment is performed.

Second Table 82

As shown in FIG. 8, the second table 82 is a table in which an application section in the left-right direction (the X axis direction) of an application region is associated with each of the sprays. The second table 82 shown in FIG. 8 is an example of a case in which the number of sprays is seven, and the left end of the platen 31 is "0" on the X axis. For example, the application section of a spray (3) is [b, c]. In other words, the spray (3) can spray the pretreatment agent onto the application section [b, c].

Figure 9:
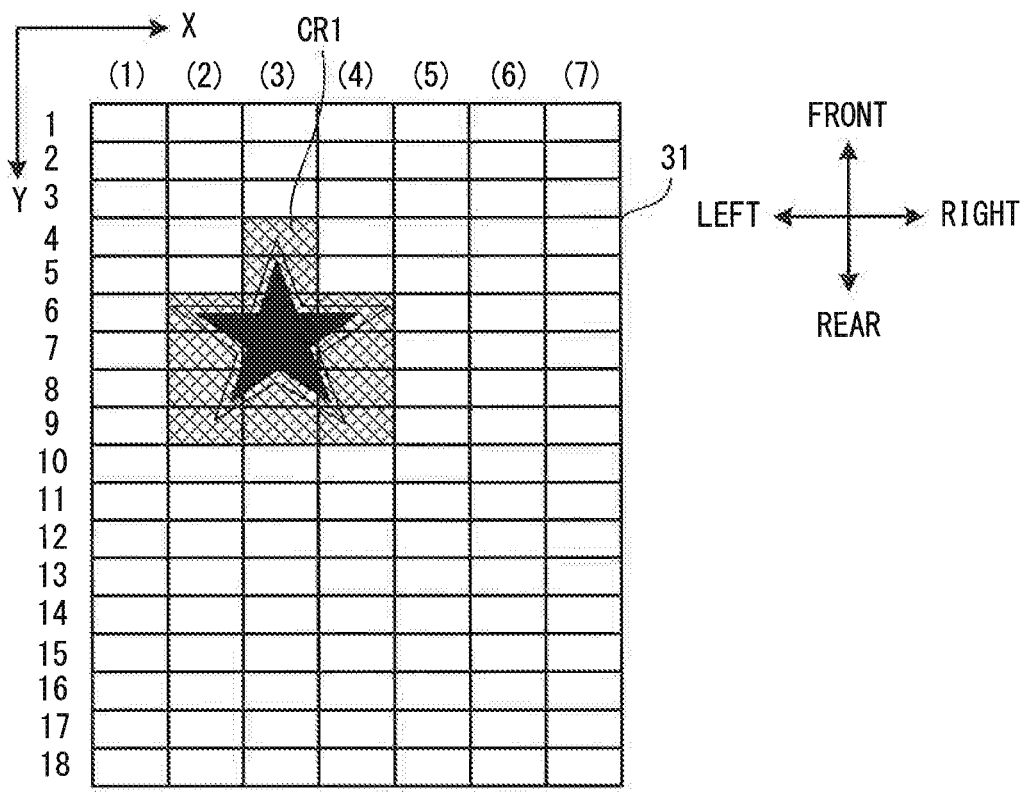
FIG. 9 is a diagram showing an example of an application range.
Figure 10:
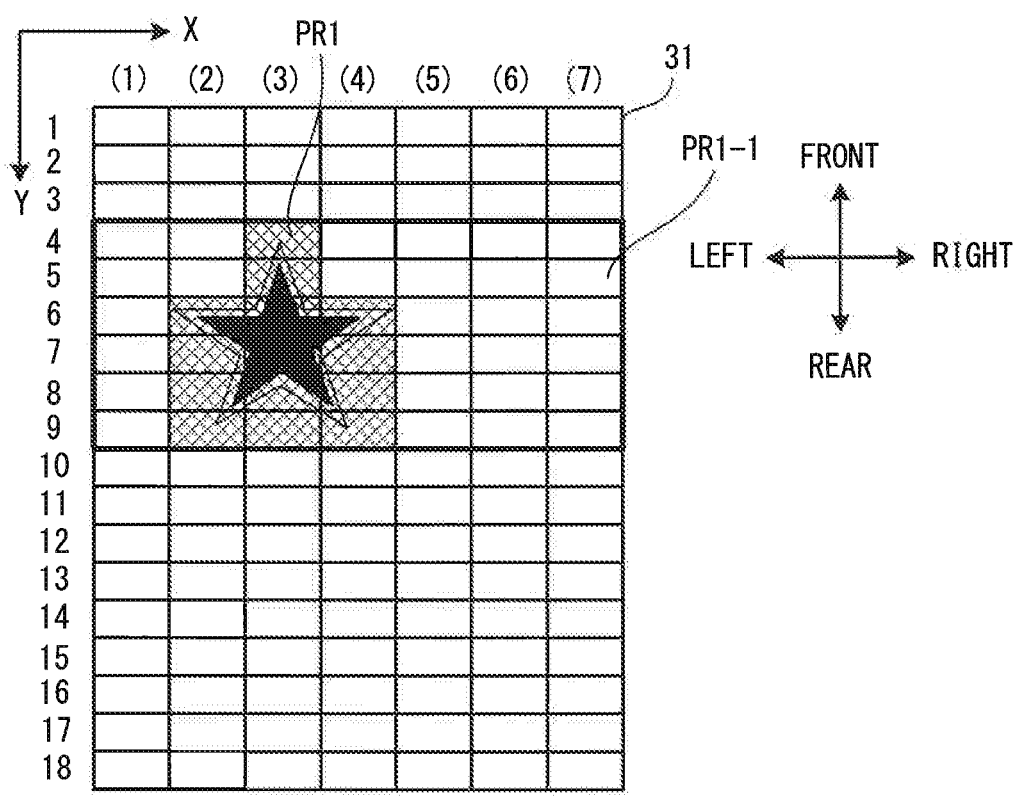
FIG. 10 is a diagram showing an example of a heat treatment range.

FIG. 9 is a diagram showing an application range CR1 in a specific example. In the example shown in FIG. 9, the application range CR1 is a hatched region. More specifically, the application range CR1 is a region formed by a region [(3), 4-5] and a region [(2)-(4), 6-9]. Each of the regions obtained by dividing the platen 31 is an application range over which each of the sprays provided in the application portion 40 of the pretreatment device 10 that performs the pretreatment can make the application in a single operation. FIG. 10 is a diagram showing heat treatment ranges PR1 and PR1-1 in the specific example. In the example shown in FIG. 10, when the heat treatment portion 50 is a near-infrared ray device or the like and is configured to be capable of performing the heat treatment on each of the regions obtained by dividing the platen 31 (divided into 7×18 regions in the examples shown in FIG. 9 and FIG. 10), the heat treatment portion 50 can perform the heat treatment on each of the divided regions under the control of the CPU 301. In this case, the heat treatment portion 50 performs the heat treatment taking the hatched region as the heat treatment range PR1. More specifically, in this case, the application range CR1 and the heat treatment range PR1 are the same range.

On the other hand, when the pretreatment device 10 is configured such that the heat treatment portion 50 is a heat press device, an air blowing device, a heat roller or the like and cannot perform the heat treatment, under the control of the CPU 301, on each of the regions obtained by dividing the platen 31 (divided into 7×18 regions in the examples shown in FIG. 9 and FIG. 10), the heat treatment portion 50 performs the heat treatment taking, for example, a region [(1)-(7), 4-9] surrounded by a thick line frame as the heat treatment range PR1-1. More specifically, the heat treatment range PR1-1 has a shape that is dependent on the configuration of the heat treatment portion 50, and, for example, if the press surface 51A shown in FIG. 2 is the same shape as the platen 31, the heat treatment range PR1-1 has the same shape as the platen 31.

First Main Processing

A flow of first main processing will be explained with reference to FIG. 11. The first main processing is performed when triggered by turning on a power source to the terminal device 3. The CPU 301 reads out the first main processing program from the HDD 304, and performs the first main processing using the RAM 303 as a working memory.

First, the CPU 301 determines whether the image data has been received (step S1). As an example, the CPU 301 determines that the image data has been received when the image data is input from the communication portion 307 or the output/input portion 308. When the image data has not been input from the communication portion 307 or the output/input portion 308, the CPU 301 determines that the image data has not been received. When it is determined that the image data has not been received (no at step S1), the CPU 301 returns the processing to step S1, and repeats the processing at step S1.

When it is determined that the image data has been received (yes at step S1), the CPU 301 determines whether the set pretreatment information button 111 of the first setting screen 91 has been selected (step S3). For example, the CPU 301 determines that the set pretreatment information button 111 has been selected, by determining that information indicating that the pretreatment information setting button 11 has been selected has been input. When it is determined that the set pretreatment information button 111 has not been selected (no at step S3), the CPU 301 repeats the processing at step S3. When it is determined that the set pretreatment information button 111 has been selected (yes at step S3), the CPU 301 controls the display portion 306 and displays the second setting screen 92 on the screen (step S5).

The CPU 301 determines whether the pretreatment information has been identified (step S7). For example, the CPU 301 determines whether each of the items of the manufacturing information of the second setting screen 92 has been set by the operator. By determining whether information has been input indicating that the OK button 112 of the second setting screen 92 has been selected, the CPU 301 determines whether each of the items of the manufacturing information of the second setting screen 92 has been set by the operator. When it is determined that each of the items of the manufacturing information of the second setting screen 92 has been set, the CPU 301 identifies the pretreatment information corresponding to each of the set items of the manufacturing information. By determining whether the identified pretreatment information has been input, the CPU 301 determines whether the pretreatment information has been identified. Further, when the set pretreatment information has been input on the second setting screen 92 by the operator, the CPU 301 determines that the pretreatment information has been identified. When it is determined that the pretreatment information has not been identified (no at step S7), the CPU 301 repeats the processing at step S7. When it is determined that the pretreatment information has been identified (yes at step S7), the CPU 301 performs range identification processing to be described later (S9). The range identification processing is processing to identify the pretreatment range 102.

The CPU 301 issues an identifier (S11). For example, the CPU 301 issues a random unique identification symbol, and stores the issued identification symbol (identifier) in the RAM 303. The CPU 301 adds a line to the first table 81 (S13). For example, the CPU 301 adds the line below the lowest line of the first table 81. The CPU 301 respectively stores the image data, the pretreatment information including the pretreatment range 102, and the identifier in columns corresponding to the line added to the first table 81 (S15). The CPU 301 returns the processing to step S1.

First Range Identification Processing

Figure 12:
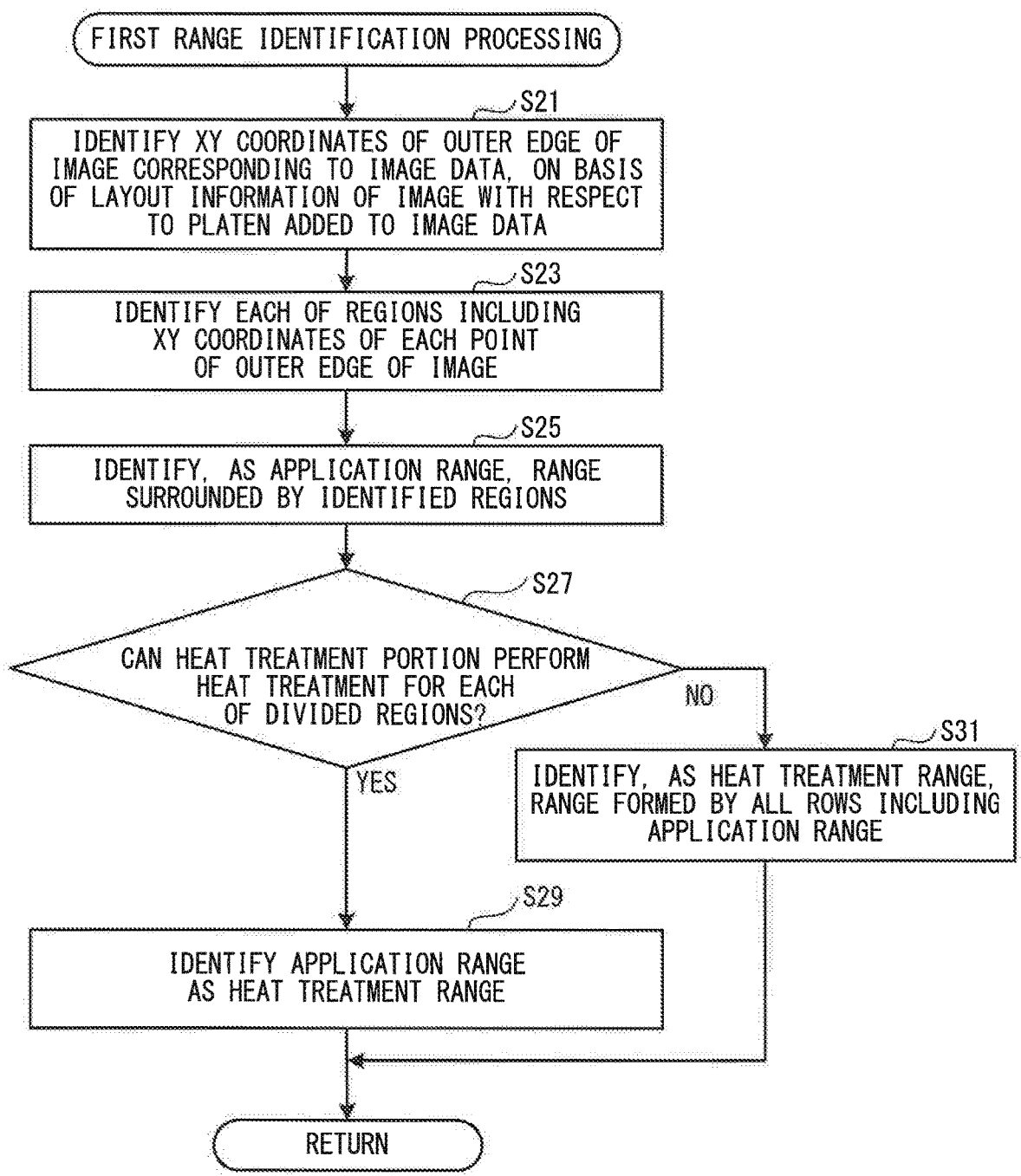
FIG. 12 is a flowchart showing a flow of first range identification processing.

A flow of first range identification processing, which is an example of the range identification processing, will be described with reference to FIG. 12. The present first range identification processing is a subroutine of processing at step S9 of the first main processing. The CPU 301 reads out a program for the first range identification processing from the HDD 304, and performs the present first range identification processing using the RAM 303 as the working memory.

Firstly, the CPU 301 identifies XY coordinates of the outer edge of the image 101 corresponding to the image data, on the basis of the layout information of the image 101 with respect to the platen 31 added to the received image data (step S21). The CPU 301 identifies areas including the XY coordinates of each of points of the outer edge of the image 101 (an area of the platen 31 divided into 7×18 regions in the examples shown in FIG. 9 and FIG. 10) (S23).

As an example, the CPU 301 identifies layout positions, on the platen 31, of each of the divided regions, on the basis of correlation information between the regions obtained by dividing the area of the platen 31 and the XY coordinates of at least the front left portion of the regions stored in the HDD 304. In this way, the CPU 301 identifies each of the regions including the XY coordinates of each of the points of the outer edge of the image 101 and stores the identified regions in the RAM 303.

The CPU 301 identifies, as the application range, a range surrounded by the identified regions (S25). The CPU 301 stores the identified application range in the RAM 303. The CPU 301 determines whether the heat treatment portion 50 of the pretreatment device 10 can perform heat treatment on each of the regions obtained by dividing the area of the platen 31 (S27). For example, the CPU 301 determines whether the heat treatment by the heat treatment portion 50 of the pretreatment device 10 that performs the pretreatment is possible for each of the divided regions of the platen 31. This determination is based on information as to whether the heat treatment is possible by the heat treatment portion 50 for each region obtained by dividing the area of the platen 31 stored in the HDD 304, for each of the connected pretreatment device 10.

When it is determined that the heat treatment is possible for each of the divided regions (yes at step S27), the CPU 301 identifies the application range identified by the processing at step S25 as a heat treatment range (S29). The CPU 301 stores the identified heat treatment range in the RAM 303. The CPU 301 advances the processing to step S11 of the first main processing. When it is determined that the heat treatment is not possible for each of the divided regions (no at step S27), the CPU 301 identifies a range, as the heat treatment range, formed by all the rows including the application range (S31). The CPU 301 stores the identified heat treatment range in the RAM 303. The CPU 301 advances the processing to step S11 of the first main processing.

Main Operation and Effects of First Embodiment

The terminal device 3 of the above-described first embodiment receives the image data and identifies the pretreatment information in the received image data. Thus, the terminal device 3 can identify the pretreatment information at a timing at which the image data is received, and can reduce a deterioration in the productivity of the pretreatment device 10 compared to when the pretreatment information is identified just before the pretreatment.

The terminal device 3 of the above-described first embodiment identifies the pretreatment information that includes pretreatment range 102. Thus, the terminal device 3 can identify the pretreatment information that includes the pretreatment range 102 at the timing at which the image data is received, and can therefore reduce the deterioration in the productivity of the pretreatment device 10 compared to when the pretreatment information including the pretreatment range 102 is identified just before the pretreatment.

The terminal device 3 of the above-described first embodiment associates the received image data with the identified pretreatment information, and stores the associated information in the first table 81 stored in the HDD 304. Thus, since the image data and the pretreatment information are associated with each other, there is a higher possibility that the pretreatment is more appropriately performed by the pretreatment device 10 over the range on which the image 101 corresponding to the image data is arranged.

The terminal device 3 of the above-described first embodiment issues the identifier, and associates the issued identifier, the received image data, and the identified pretreatment information with each other and stores them in the first table 81 stored in the HDD 304. Thus, since the image data and the pretreatment information are associated with each other by the identifier, the possibility is reduced that the pretreatment may be mistakenly performed on the basis of different pretreatment information. As a result, there is a higher possibility that the pretreatment will be more appropriately performed by the pretreatment device 10 over the range on which the image 101 corresponding to the image data is arranged.

The terminal device 3 of the above-described first embodiment identifies the application range and the heat treatment range as the pretreatment range 102. Thus, the terminal device 3 can identify the application range and the heat treatment range at the timing at which the image data is received, and therefore, can reduce the deterioration in the productivity of the pretreatment device 10 compared to when the application range and the heat treatment range are identified just before the pretreatment.

The terminal device 3 of the above-described first embodiment identifies each of the regions obtained by dividing the area of the platen 31 including each of the points of the outer edge of the image 101 corresponding to the received image data, and identifies the region surrounded by the identified regions as the application area. A section of the regions obtained by dividing the area of the platen 31 in an X axis direction corresponds to a section in the X axis direction of the application range of each of the sprays. Thus, since the application range is formed by each of the application ranges of the plurality of sprays, the terminal device 3 can more appropriately identify the application range. As a result, there is a higher possibility that the pretreatment will be more appropriately performed by the pretreatment device 10.

When the heat treatment can be performed by the heat treatment portion 50 of the pretreatment device 10 that performs the pretreatment for each of the regions obtained by dividing the area of the platen 31, the terminal device 3 of the above-described first embodiment identifies the application range as the heat treatment range. Thus, the terminal device 3 can more appropriately identify the heat treatment range, since the heat treatment range is formed by a unit range (the range obtained by dividing the area of the platen 31) over which the heat treatment can be performed by the heat treatment portion 50 of the pretreatment device 10. As a result, there is a higher possibility that the pretreatment can be more appropriately performed by the pretreatment device 10.

The terminal device 3 of the above-described first embodiment receives the manufacturing information, and identifies the pretreatment information corresponding to the manufacturing information on the basis of the received manufacturing information. Thus, there is a higher possibility that the pretreatment will be more appropriately performed by the pretreatment device 10 based on the characteristics of the recording medium.

When the heat treatment portion 50 of the pretreatment device 10 that performs the pretreatment cannot perform the heat treatment for each of the regions obtained by dividing the area of the platen 31, the terminal device 3 of the above-described first embodiment identifies a range, as the heat treatment range, formed by all the rows including the application range. Thus, the terminal device 3 can identify the heat treatment range more appropriately in accordance with the pretreatment device 10 that performs the pretreatment. Further, the terminal device 3 can identify the heat treatment range in which it is possible to reduce an error by the pretreatment device 10 that performs the pretreatment.

Second Embodiment

The configuration of the network 4 according to a second embodiment is substantially the same as the configuration of the terminal device 3 of the first embodiment. Therefore, different portions will be explained and an explanation of the portions that are the same will be omitted here. In the second embodiment, the HDD 304 stores the first setting screen 91 and a third setting screen 93. Each of material information that can be set on the third setting screen 93 is associated with the pretreatment information that does not include the pretreatment range 102 and is stored in the HDD 304. The HDD 304 stores a second main processing program to be described later.

Third Setting Screen 93

As shown in FIG. 13, the third setting screen 93 is another example of a setting screen for setting the pretreatment information excluding the pretreatment range 102. In the third setting screen 93, the material information in place of the manufacturing information is selected by the operator. On the right side of the third setting screen 93 each item of the pretreatment information corresponding to the selected material information is displayed. When the operator selects the OK button 112, the pretreatment information is set. The set pretreatment information is input into the CPU 301.

The material information is, for example, a thickness, a material, a knit/weave, and a color of a fabric. The thickness of the fabric is information of a weight of the fabric per unit area. The material is information about the material of the fabric of the recording medium, such as cotton, polyester, and a cotton polyester mix. The knit/weave is information of a knitting method or a weaving method of the fabric. The color is information of the color of the recording medium.

On the third setting screen 93 of the present embodiment, the pretreatment information corresponding to each item of the selected material information is automatically set by selecting each of the items of the material information. FIG. 13 shows a case in which the thickness, the material, the knit/weave, and the color of the fabric selected by the operator as the material information are, respectively, TH2, MT1, WE2, and CL2. In this case, the CPU 301 displays, in the respective columns, the pretreatment information corresponding to each of the items of the selected material information, namely, the application amount per unit area (mg/cm$^2$), the type of the pretreatment agent, the heat treatment pressure (N/cm$^2$), the heat treatment time period (sec), the heat treatment temperature (° C.), and the like.

Further, the third setting screen 93 of the present embodiment can directly specify the pretreatment information. FIG. 14 shows an example of a case in which the pretreatment information is directly specified. When the pretreatment information is directly specified, the operator selects the manual setting on the third setting screen 93. By selecting the manual setting, a desired value or a desired type of pretreatment agent can be input into the column of each item of the pretreatment information. After the desired value or the desired type of pretreatment agent has been input into the column of each item of the pretreatment information by the operator, when the OK button 112 is selected, the input pretreatment information is set. The set pretreatment information is input into the CPU 301.

Second Main Processing

Figure 15:
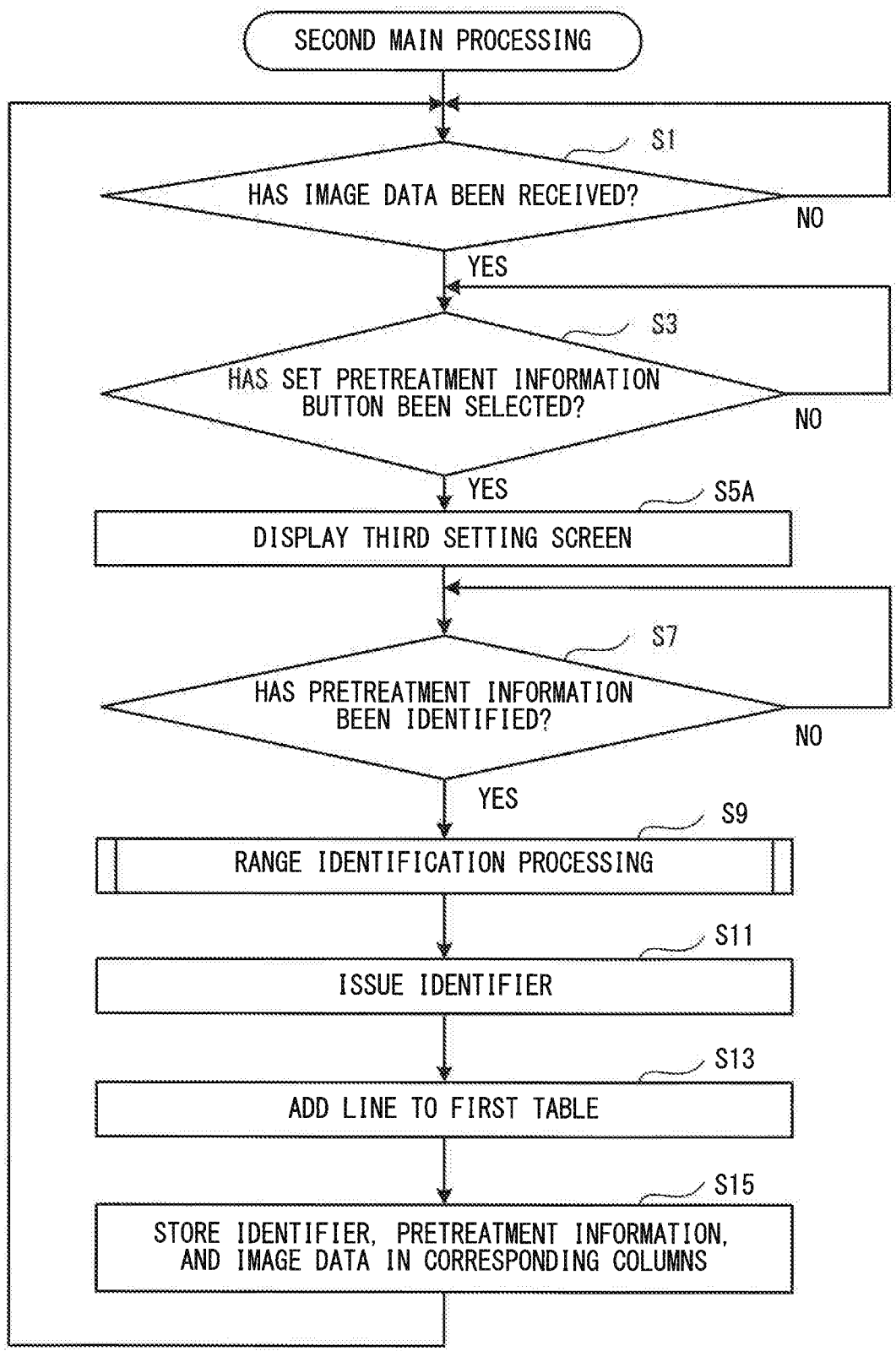
FIG. 15 is a flowchart showing a flow of second main processing.

A flow of second main processing will be explained with reference to FIG. 15. The second main processing is performed when triggered by turning on the power source of the terminal device 3. The CPU 301 reads out the program for the second main processing stored in the HDD 304, and performs the second main processing using the RAM 303 as the working memory.

Figure 11:
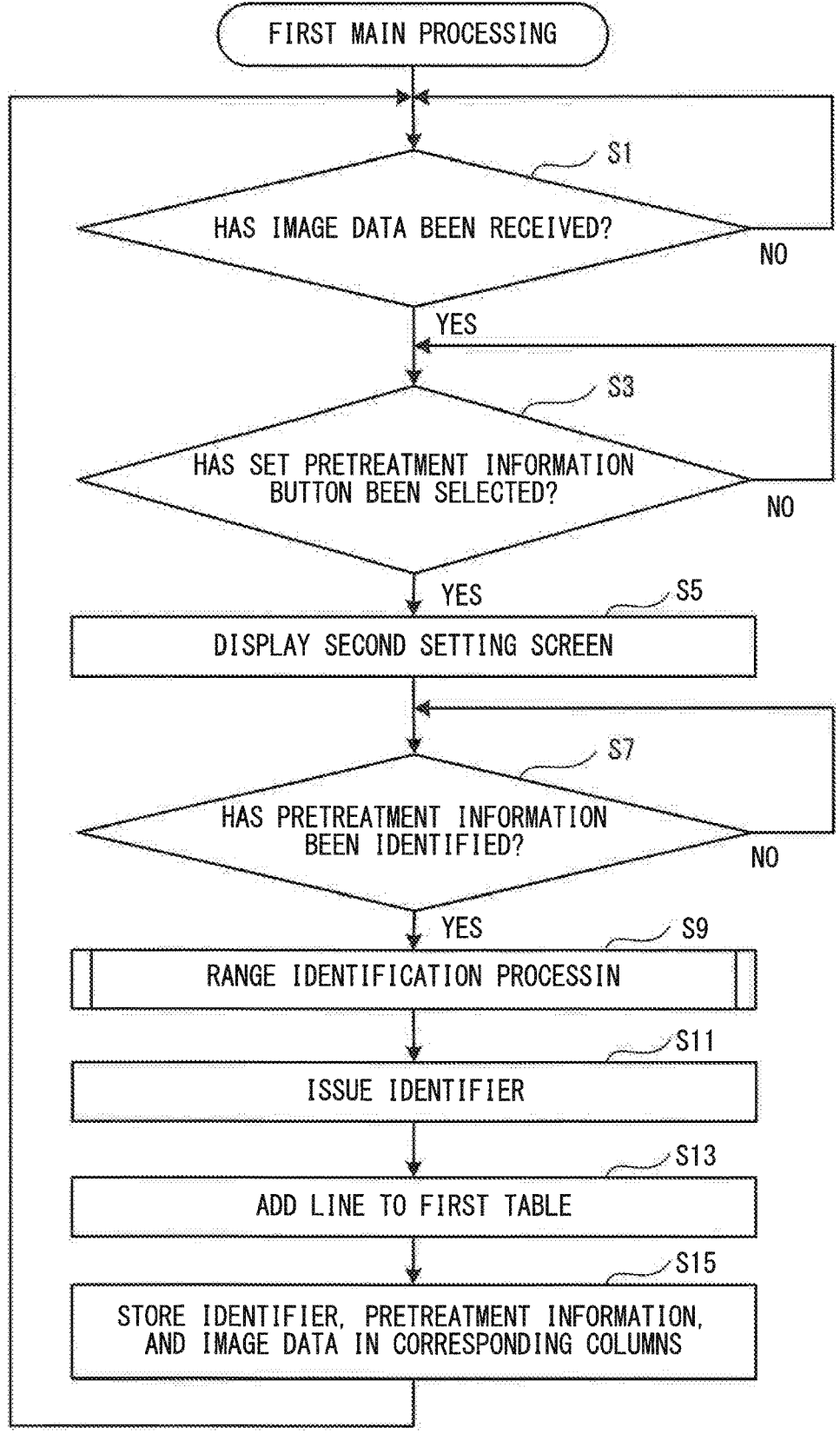
FIG. 11 is a flowchart showing a flow of first main processing.

Firstly, the processing at step S1 to step S3, and the processing at step S7 to step S15 of the second main processing are the same as the processing from step S1 to step S3, and the processing from step S7 to step S15 of the first main processing shown in FIG. 11, and an explanation thereof is omitted here. Note that, in the processing at step S7, each item of the material information is selected in place of the manufacturing information of the first main processing.

When it is determined that the set pretreatment information button 111 has been selected in the processing at step S3 (yes at step S3), the CPU 301 controls the display portion 306, and displays the third setting screen 93 on the screen of the display portion 306 (step S5A). The CPU 301 performs the processing from step S7 to step S15. The CPU 301 returns the processing to step S1 after performing the processing at step S15.

Main Operations and Effects of Second Embodiment

The terminal device 3 of the above-described second embodiment receives the image data and identifies the pretreatment information with respect to the received image data. Thus, the terminal device 3 can identify the pretreatment information at the timing at which the image data is received, and can therefore reduce the deterioration of the productivity of the pretreatment device 10 compared to when the pretreatment information is identified just before the pretreatment.

The terminal device 3 of the above-described second embodiment receives the material information and identifies the pretreatment information corresponding to the material information on the basis of the received material information. Thus, there is a higher possibility that the pretreatment is more appropriately performed by the pretreatment device 10 on the basis of the characteristics of the recording medium.

The terminal device 3 of the above described second embodiment transmits first information, which is information in which the received image data, the issued identifier, and the identified pretreatment range 102 are associated with each other, to an external device, such as the server 2, via the communication portion 307. The terminal device 3 transmits second information, which is information in which the identified pretreatment information is associated with the issued identifier, to the external device, such as the server 2. Thus, the terminal device 3 can cause the external device, such as the server 2, to hold correlation information in which the identifier, the image data, the pre-treatment range 102, and the pretreatment information are associated with each other. Therefore, since the terminal device 3 does not need to hold the first table 81, a storage device can be effectively used, and costs of the terminal device 3 can be reduced.

Third Embodiment

The configuration of the network 4, and the configuration of the terminal device 3 of the third embodiment are substantially the same as those of the first embodiment. Thus, different portions will be explained, and an explanation of the same portions will be omitted here. In the third embodiment, the HDD 304 stores a third main processing program to be described later.

Third Main Processing

Figure 16:
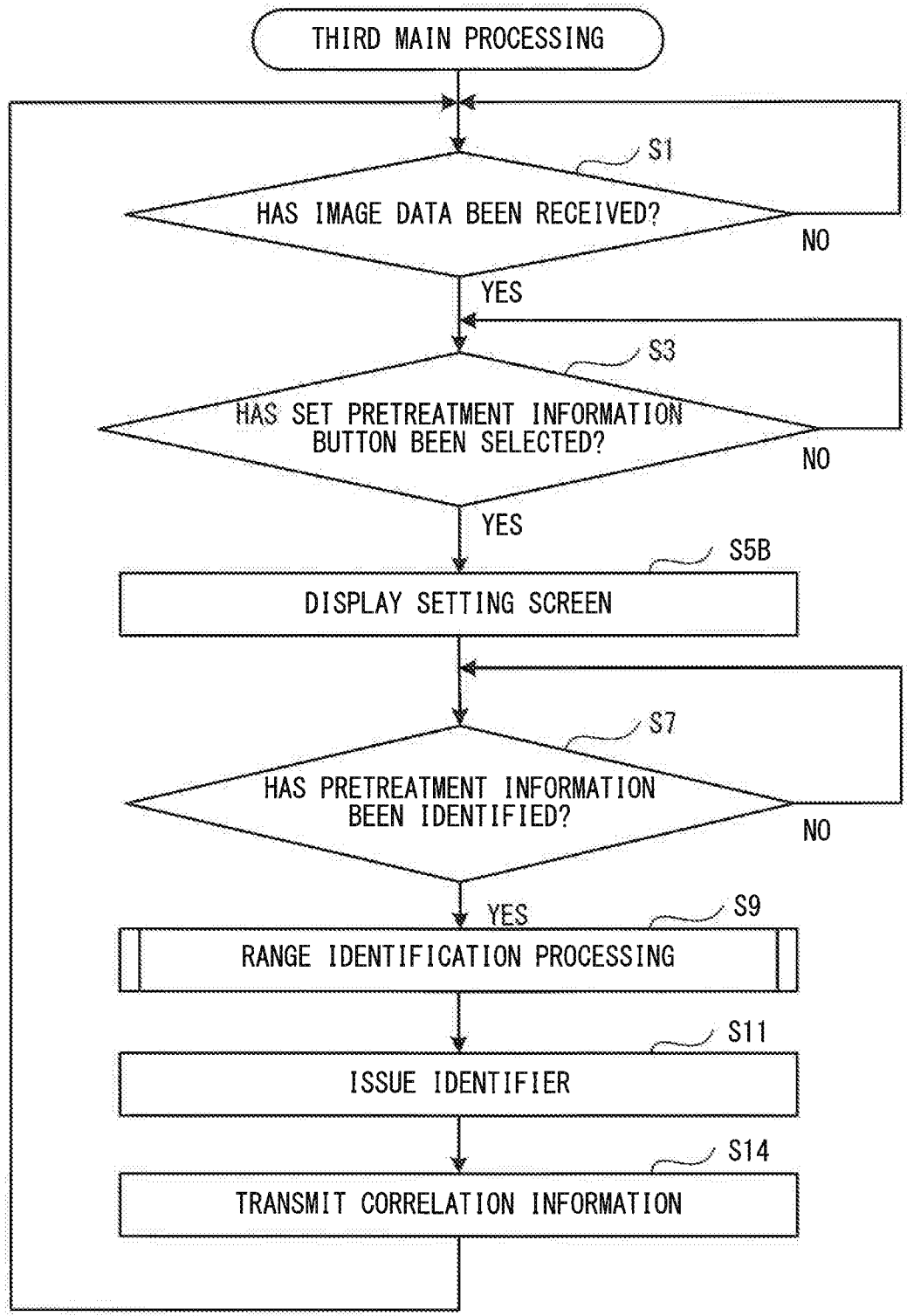
FIG. 16 is flowchart showing a flow of third main processing.

A flow of third main processing will be explained with reference to FIG. 16. The third main processing is performed when triggered by turning on the power source of the terminal device 3. The CPU 301 reads out the third main processing program from the HDD 304 and performs the third main processing using the RAM 303 as the working memory.

First, the processing at step S1 to step S3, and the processing at step S7 to step S11 of the third main processing are the same as the processing at step S1 to step S3, and step S7 to step S11 of the first main processing shown in FIG. 11, and an explanation thereof is thus omitted here.

When it is determined by the processing at step S3 that the set pretreatment information button 111 has been selected (yes at step S3), the CPU 301 controls the display portion 306 and displays the second setting screen 92 or the third setting screen 93 on the screen of the display portion 306 (step S5B). The CPU 301 performs the processing from step S7 to step S11. The CPU 301 transmits, via the communication portion 307, the correlation information in which the image data, the pretreatment information including the pretreatment range 102, and the identifier are associated with each other, to an external device, such as the server 2, in order to store the correlation information in the external device such as the server 2 (step S14). The CPU 301 returns the processing to step S1.

Main Operations and Effects of Third Embodiment

The terminal device 3 of the above described third embodiment receives the image data and identifies the pretreatment information with respect to the received image data. Thus, the terminal device 3 can identify the pretreatment information at the timing at which the image data is received, and thus can reduce the deterioration in the productivity of the pretreatment device 10 compared to when the pretreatment information is identified just before the pretreatment.

Fourth Embodiment

The configuration of the network 4, and the configuration of the terminal device 3 of the fourth embodiment are substantially the same as those of the first embodiment. Thus, different portions will be explained and an explanation of the same portions will be omitted here. In the fourth embodiment, the HDD 304 stores a second range identification processing program. Further, the HDD 304 stores a third predetermined scale factor z (z>1).

First Identification Method of Pretreatment Range 102

Figure 17:
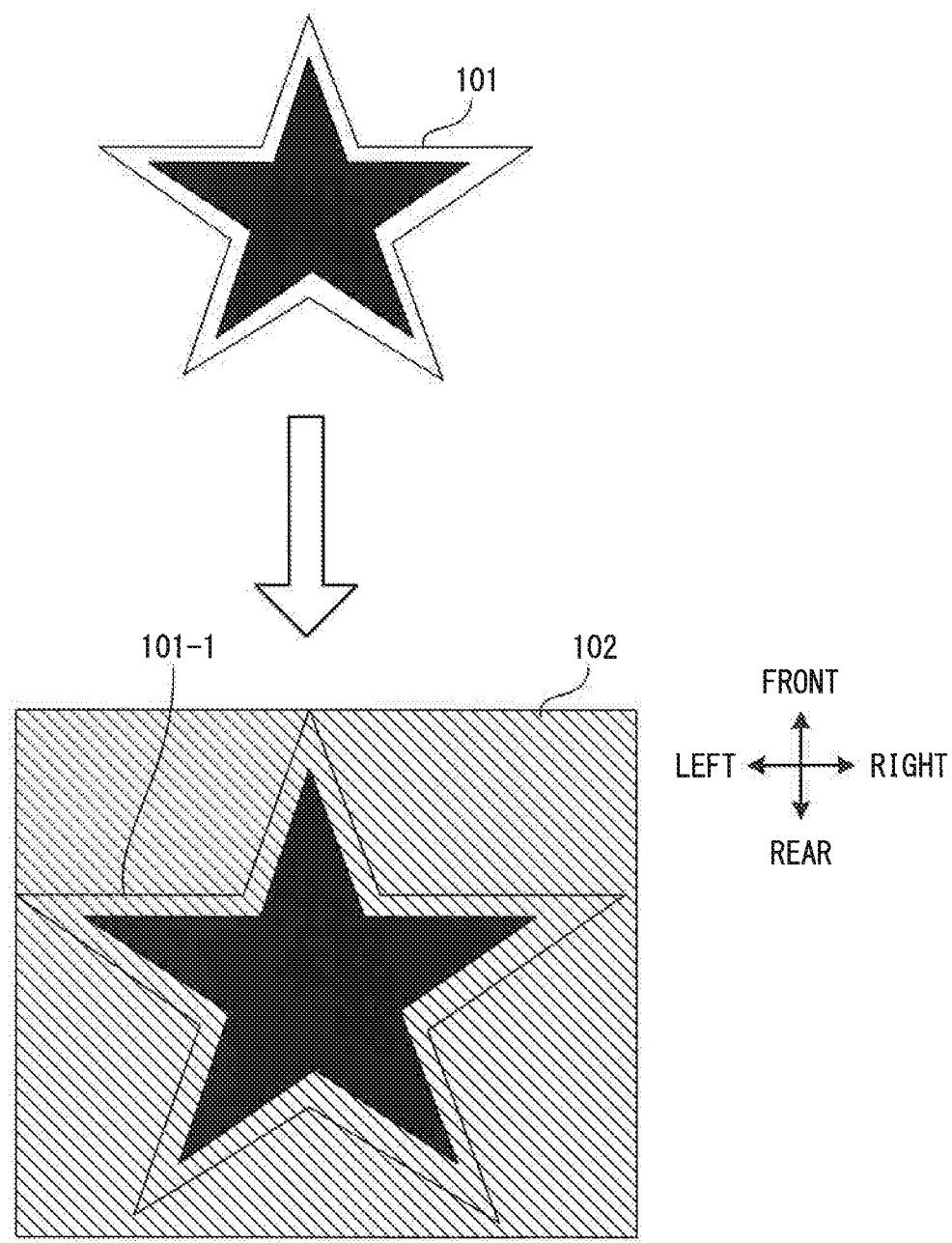
FIG. 17 is a diagram illustrating a first identification method of a pretreatment range.

A first identification method of the pretreatment range 102 will be explained with reference to FIG. 17. The first identification method of the pretreatment range 102 is performed by second range identification processing, which is an example of the range identification processing. The image 101 corresponding to the received image data is a black star, as shown in FIG. 17. In the first identification method of the pretreatment range 102, the CPU 301 expands the image 101 by the third predetermined scale factor z stored in the HDD 304. The CPU 301 identifies XY coordinates on the platen 31 at each of points of the outer edge of an image 101-1 after the expansion. The CPU 301 identifies minimum values and maximum values of the values of the X coordinate and the Y coordinate of the XY coordinates on the platen 31 of each of the points of the outer edge of the expanded image 101-1. The CPU 301 identifies a rectangular shape of the pretreatment range 102 that includes all the XY coordinates having the minimum values or the maximum values.

When the expanded image 101-1 extends beyond the area of the platen 31, the CPU 301 reduces the image 101-1. At that time, the CPU 301 reduces the image 101-1 such that all the XY coordinates having the minimum values or the maximum values of the values of the X coordinate and the Y coordinate of the XY coordinates on the platen 31 of each of the points of the outer edge of the expanded image 101-1 are included in the area of the platen 31. The CPU 301 identifies the rectangular shape of the pretreatment range 102 that does not extend beyond the area of the platen 31 including the area of the reduced image 101.

"The expanded image 101-1 extends beyond the area of the platen 31" refers to a case in which any of the XY coordinates of each of the points of the outer edge of the expanded image 101-1 is a negative value. Further, this refers to a case in which at least one among the X coordinates and the Y coordinates of any of the XY coordinates of each of the points of the outer edge of the expanded image 101-1 exceeds a value of one of the X coordinates or the Y coordinates of the XY coordinates of a front right end point and a rear left end point of the platen 31 stored in the HDD 304.

Note that, with respect to the XY coordinates of the platen 31, the X axis is parallel to the left-right direction, and a direction from the left to the right is a positive direction of the X axis. Further, the Y axis is parallel to the front-rear direction, and a direction from the front to the rear is a positive direction of the Y axis. An origin point is the front left end point of the platen 31.

Second Range Identification Processing

Figure 18:
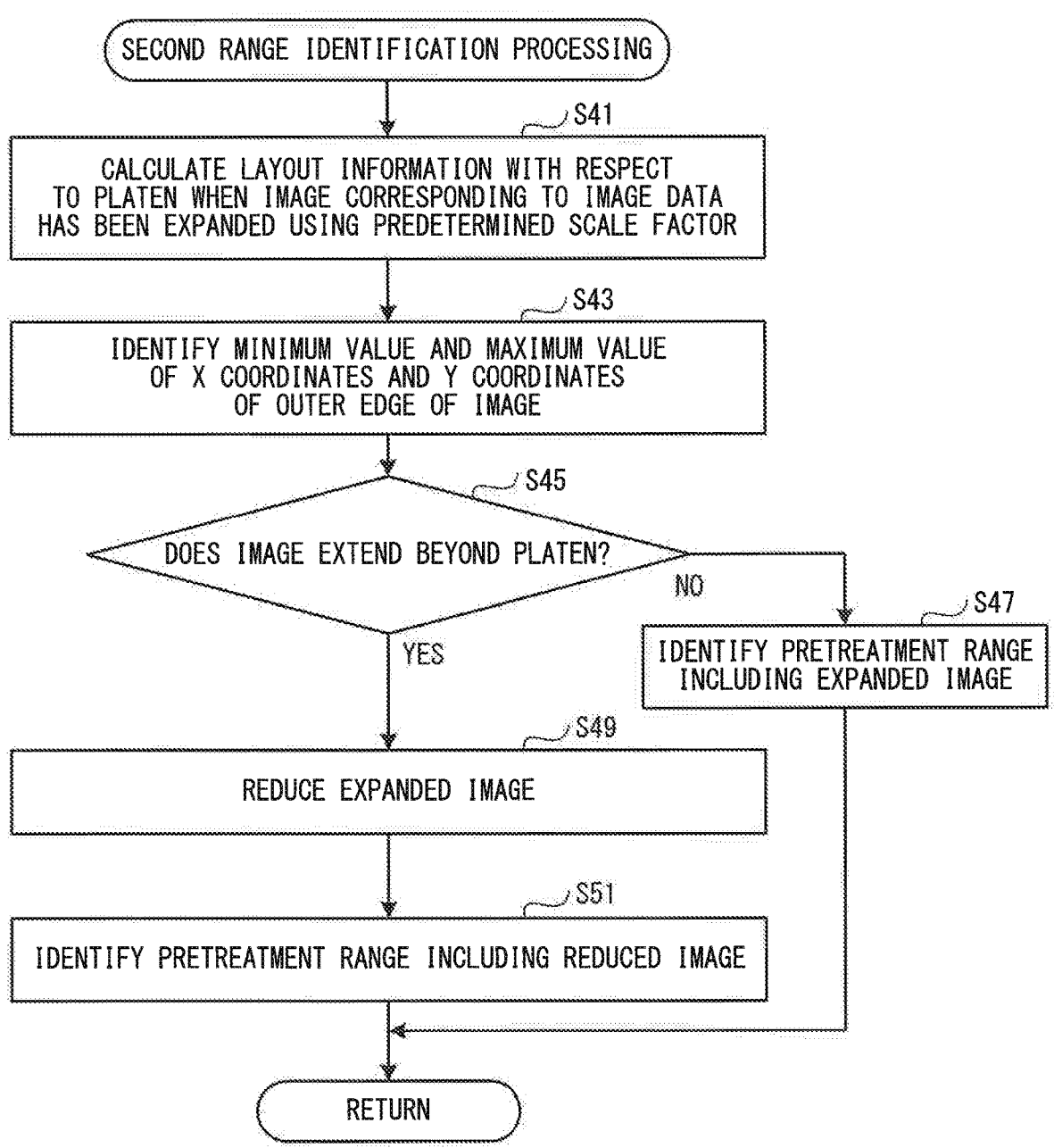
FIG. 18 is a flowchart showing a flow of second range identification processing.

A flow of second range identification processing will be explained with reference to FIG. 18. The second range identification processing is a subroutine of the processing at step S9 of the first main processing to the third main processing. The CPU 301 reads out a second range identification processing program from the HDD 304 and performs the second range identification processing using the RAM 303 as the working memory.

First, the CPU 301 calculates layout information with respect to the platen 31 of the image 101 corresponding to the image data after the expansion by the third predetermined scale factor z (step S41). For example, on the basis of the layout information of the image 101 with respect to the platen 31 added to the image data, the CPU 301 identifies the XY coordinates on the platen 31 of each of the points of the outer edge of the expanded image 101-1, and stores the XY coordinates in the RAM 303. The CPU 301 identifies the minimum value and the maximum value of the X coordinate and the Y coordinate of the outer edge of the expanded image 101-1 (step S43). For example, the CPU 301 identifies the minimum value and the maximum value of the values of the X coordinate and the Y coordinate of the XY coordinates on the platen 31 of each of the points of the outer edge of the expanded image 101-1, and stores the identified minimum value and the maximum value of the values of the X coordinate and the Y coordinate in the RAM 303.

The CPU 301 determines whether the expanded image 101-1 extends beyond the area of the platen 31 (step S45). For example, the CPU 301 determines whether all of the XY coordinates having the identified minimum value or maximum value of the values of the X coordinate and the Y coordinate are included in the area of the platen 31, and thus determines whether the expanded image 101-1 extends beyond the area of the platen 31. Since at least the XY coordinates of the front right end point and the rear left end point of the platen 31 are stored in the HDD 304, the CPU 301 can determine whether the expanded image 101-1 extends beyond the area of the platen 31.

When it is determined that the expanded image 101-1 does not extend beyond the area of the platen 31 (no at step S45), the CPU 301 identifies the pretreatment range 102 including the expanded image 101-1 (step S47). For example, the CPU 301 identifies the rectangular shaped pretreatment range 102 that includes the expanded image 101-1 and that does not extend beyond the area of the platen 31, and stores the identified pretreatment range 102 in the RAM 303. The CPU 301 advances the processing to step S 11 that is being performed in the first main processing to the third main processing.

When it is determined that the expanded image 101-1 extends beyond the platen 31 (yes at step S45), the CPU 301 reduces the expanded image 101-1 (step S49). For example, the CPU 301 reduces the expanded image 101-1 such that all the XY coordinates having the identified minimum value or maximum value are included in the area of the platen 31. The CPU 301 identifies the pretreatment range 102 that includes the reduced image 101 (step S51). For example, the CPU 301 identifies the rectangular shaped pretreatment range 102 that includes the reduced image 101 and that does not extend beyond the area of the platen 31, and stores the identified pretreatment range 102 in the RAM 303. The CPU 301 advances the processing to step S 11 that is being performed in the first main processing to the third main processing.

Main Operations and Effects of Fourth Embodiment

The terminal device 3 of the above described fourth embodiment expands the image 101 corresponding to the received image data by the third predetermined scale factor z, and identifies the pretreatment range 102 that includes the expanded image 101-1. Thus the terminal device 3 causes the pretreatment range 102 to be the range including the expanded image 101-1. As a result, when the pretreatment is performed by the pretreatment device 10, even if the pretreatment range 102 is displaced, there is a higher possibility that the pretreatment will be appropriately performed over the range on which the image 101 is arranged.

The pretreatment range 102 of the above described fourth embodiment is rectangular shaped. Thus, the terminal device 3 can more appropriately identify the area including the expanded image 101-1 than when identifying the area including the expanded image 101-1 of a shape formed by curved lines, such as a circle or the like. As a result, there is a higher possibility that the pretreatment will be more appropriately performed by the pretreatment device 10.

When the expanded image 101-1 extends beyond the area of the platen 31, the terminal device 3 of the above described fourth embodiment reduces the expanded image 101-1 such that it does not extend beyond the area of the platen 31, and once more identifies the pretreatment range 102 including the reduced image 101. As a result, the terminal device 3 does not identify the pretreatment range 102 that extends beyond the area of the platen 31, and thus, identifies the pretreatment range 102 that can reduce an error by the pretreatment device 10.

Fifth Embodiment

The configuration of the network 4 and the configuration of the terminal device 3 according to the fourth embodiment are substantially the same as those of the first embodiment. Thus, different portions will be explained, and an explanation of the same portions will be omitted here. In the fifth embodiment, the HDD 304 stores a third range identification processing program to be described later. The HDD 304 stores the XY coordinates of at least the front right end point and the rear left end point of the platen 31, of XY coordinates to be described later with respect to the platen 31 (refer to FIG. 19).

Second Identification Method of Pretreatment Range 102

Figure 19:
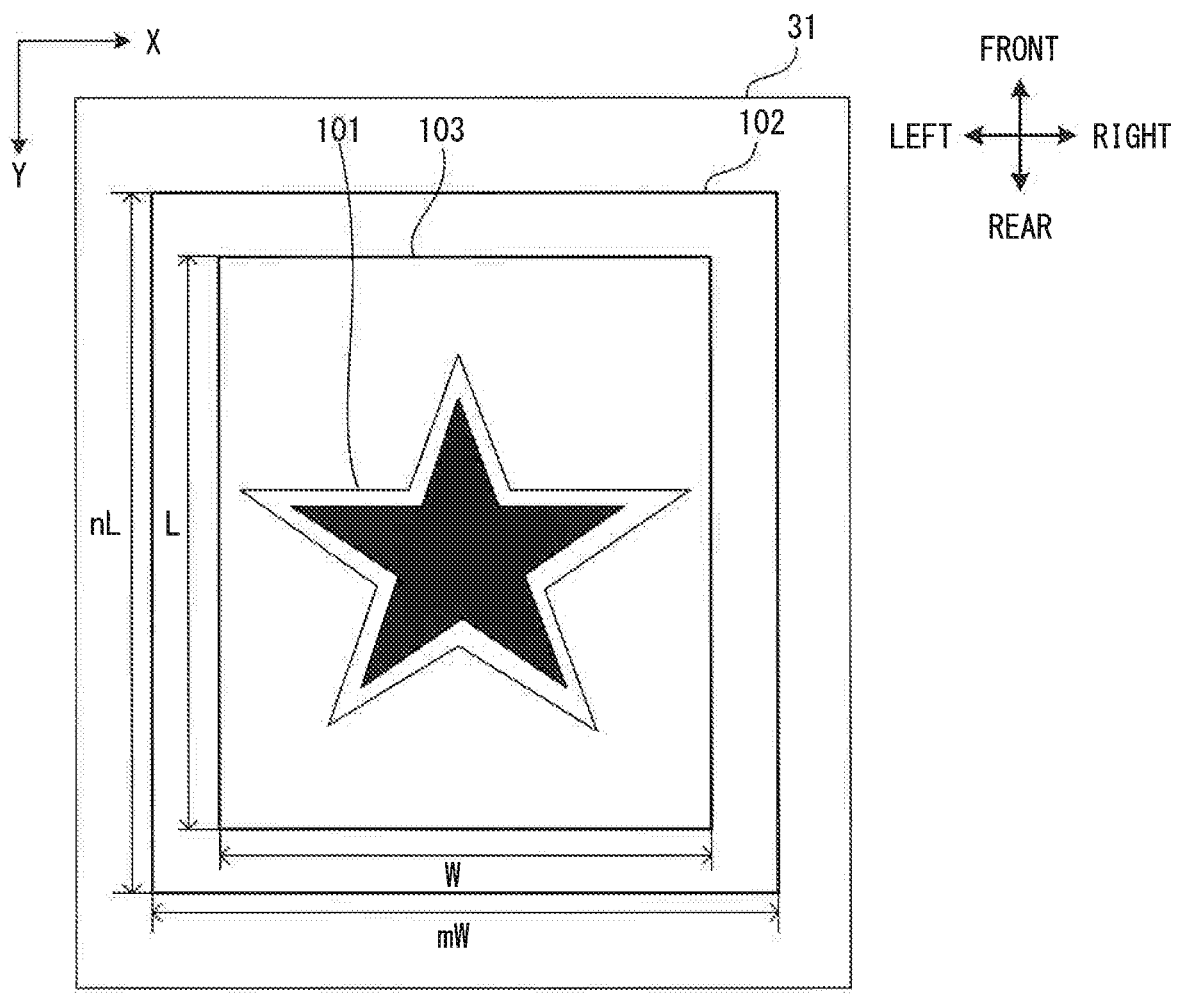
FIG. 19 is a diagram illustrating a second identification method of the pretreatment range.

A second identification method of the pretreatment range 102 will be explained with reference to FIG. 19. The second identification method of the pretreatment range 102 is performed by third range identification processing to be described later. The image 101 corresponding to the image data is the black star as shown in FIG. 19. A first setting method of the pretreatment range 102 sets a rectangular shaped margin region 103 that includes the image 101. A ratio between a length L and a width W of the margin region 103 is set in advance, and information of this ratio is stored in the HDD 304. The ratio between the length L and the width W of the margin region 103 may be the same as a ratio between a length in the long direction (the front-rear direction) of the platen 31 and a length of the short direction (left-right direction) of the platen 31, or may be different.

The CPU 301 expands the length L of the set margin region 103 by a first predetermined scale factor n (n>1), and the width W by a second predetermined scale factor m (m>1). The first predetermined scale factor n and the second predetermined scale factor m may be the same, or may be different from each other. The first predetermined scale factor n and the second predetermined scale factor m may be values that are set in advance and stored in the HDD 304. The CPU 301 identifies the expanded area as the pretreatment range 102. At this time, when the identified pretreatment range 102 extends beyond the area of the platen 31, the CPU 301 identifies, as the pretreatment range 102, a range obtained by removing the portion that extends beyond the area of the platen 31 from the set pretreatment range 102.

"The identified pretreatment range 102 extends beyond the area of the platen 31" refers to a case in which one of the XY coordinates of four corners of the identified pretreatment range 102 is a negative value. Further, this refers to a case in which at least one of any of the values of the X coordinate and the Y coordinate of the XY coordinates of the four corners of the identified pretreatment range 102 exceeds the value of the X coordinate or the Y coordinate of the XY coordinates of the front right end point and the rear left end point of the platen 31 stored in the HDD 304.

Third Range Identification Processing

A flow of the third range identification processing will be explained with reference to FIG. 20. The third range identification processing is a subroutine of the processing at step S9 of the first main processing to the third main processing. The CPU 301 reads out the third range identification processing program from the HDD 304 and performs the third range identification processing using the RAM 303 as the working memory.

First, the CPU 301 identifies XY coordinates of each points of the outer edge of the image 101, on the basis of the layout information of the image 101 added to the received image data (step S61). Note that the layout information of the image 101 is the layout information of the image 101 corresponding to the image data on the platen 31. The CPU 301 sets the rectangular shaped margin region 103 that includes the image 101 (step S63). For example, the CPU 301 identifies a minimum value and a maximum value of the X coordinates of the image 101, and a minimum value and a maximum value of the Y coordinates, on the basis of the XY coordinates of each of the points of the outer edge of the image 101. The CPU 301 sets the margin region 103 including all of the identified minimum values and the maximum values of the X coordinates and the Y coordinates, and stores the set information of the margin region 103 in the RAM 303.

On the basis of the set margin region 103, the CPU 301 identifies the pretreatment range 102 (step S65). For example, the CPU 301 expands the length L (the front-rear direction) of the set margin region 103 by the first predetermined scale factor n, and expands the width W (the left-right direction) by the second predetermined scale factor m. The CPU 301 identifies the expanded margin region 103 as the pretreatment range 102.

The CPU 301 determines whether the identified pretreatment range 102 extends beyond the area of the platen 31 (step S67). For example, by determining whether any of the XY coordinates of the four corners of the identified pretreatment range 102 is the negative value, the CPU 301 determines whether the identified pretreatment range 102 extends beyond the area of the platen 31. Further, the CPU 31 determines whether at least one of any of the values of the X coordinates and the Y coordinates of the XY coordinates of the four corners of the identified pretreatment range 102 exceeds the value of the X coordinate and the Y coordinate of the XY coordinates of the front right end point and the rear left end point of the platen 31 stored in the HDD 304. As a result of this determination, the CPU 301 determines whether the identified pretreatment range 102 extends beyond the area of the platen 31.

When it is determined that the identified pretreatment range 102 extends beyond the area of the platen 31 (yes at step S67), the CPU 301 once more identifies the pretreatment range 102 on the basis of the area of the platen 31 (step S69). For example, the CPU 301 identifies, as the pretreatment range 102, a region obtained by removing the range extending beyond the area of the platen 31. The CPU 301 advances the processing to step S11 that is being performed in the first main processing to the third main processing. When it is determined that the identified pretreatment range 102 does not extend beyond the area of the platen 31 (no at step S67), the CPU 301 advances the processing to step S11 that is being performed in the first main processing to the third main processing.

Main Operations and Effects of Fifth Embodiment

The terminal device 3 of the above described fifth embodiment sets the margin region 103 that includes the image 101, and identifies the pretreatment range 102 on the basis of the set margin region 103. As a result, the terminal device 3 can identify the pretreatment range 102 on the basis of the margin region 103, even when the pretreatment range 102 is not specified by the operator.

When the identified pretreatment range 102 extends beyond the area of the platen 31, the terminal device 3 of the above described fifth embodiment once more identifies, as the pretreatment range 102, a region obtained by removing the range extending beyond the area of the platen 31. As a result, the terminal device 3 does not identify the pretreatment range 102 that extends beyond the area of the platen 31, and can thus identify the pretreatment range 102 that can reduce an error by the pre-treatment device 10.

Modified Examples

An order of each of the steps of the first main processing to the third main processing may be rearranged, long as there is no contradiction. Further, each of the steps of the first main processing to the third main processing may be rearranged or combined, as long as there is no contradiction.

For example, the processing at step S3 to step S7 of the first main processing to the third main processing may be performed after step S11, or may be performed after step S13.

In the first main processing and in the second main processing, it is explained that the terminal device 3 identifies the pretreatment information on the basis of the manufacturing information or the material information, but may identify the pretreatment information on the basis of the manufacturing information and the material information. As a result, the terminal device 3 identifies the pretreatment information on the basis of at least one of the manufacturing information and the material information. Information including at least one of the manufacturing information and the material information is referred to as "media information".

The first pretreatment identification processing may also be applied to the second main processing and the third main processing, not only to the first main processing.

In the first identification method of the pretreatment range 102, the CPU 301 identifies the rectangular pretreatment range 102 that includes the image 101 corresponding to the received image data. However, for example, the CPU 301 may identify the pretreatment range 102 of another shape that includes the image 101, such as a circle, an ellipse, or the like.

In the second identification method of the pretreatment range 102, the CPU 301 identifies the pretreatment range 102 that includes the expanded image 101-1, after determining whether the expanded image 101-1 extends beyond the area of the platen 31. However, for example, the CPU 301 may identify whether the identified pretreatment range 102 extends beyond the area of the platen 31 after the pretreatment range 102 that includes the expanded image 101-1 has been identified.

In the second identification method of the pretreatment range 102, the explanation is given in which, the CPU 301 causes the range formed by all the rows including the application range to be the heat treatment range when the heat treatment portion 50 of the pretreatment device 10 cannot perform the heat treatment for each of the regions obtained by dividing the platen 31. However, for example, the CPU 301 may identify the range, as the heat treatment range, formed by all the columns including the application range.

In the explanation of the identification method of the heat treatment range according to the specific examples shown in FIG. 9 and FIG. 10, the explanation is given in which, when the heat treatment portion 50 provided in the pre-treatment device 10 that performs the pretreatment can perform the heat treatment for each of the regions obtained by dividing the area of the platen 31, the CPU 301 identifies the application range as the heat treatment range. However, the CPU 301 may identify a unit range over which the heat treatment portion 50 can perform the heat treatment and which includes each of the points of the outer edge of the image 101 corresponding to the received image data, and may identify, as the heat treatment range, a range surrounded by the identified unit range.

The explanation of each of the embodiments is given in which the terminal device 3 is an example of the pretreatment information generation device, but the pretreatment information generation device may be the pre-treatment device 10, or maybe the printer 1.

The explanation is given, in each of the above described embodiments, in which the application amount of the pre-treatment agent included in the pretreatment information is the application amount per unit area ($mg/cm^2$). However, the application amount of the pre-treatment agent included in the pretreatment information may be, for example, an application amount of a predetermined area, or may be an application amount of the pretreatment range 102.

When identifying the pretreatment information in the processing at step S7 on the second setting screen 92 displayed by the processing at step S5 of the first main processing, when identifying the pre-treatment information in the processing at step S7 on the third setting screen 93 displayed by the processing at step S5A of the second main processing, and when identifying the pretreatment information by the processing at step S7 on the second setting screen 92 or the third setting screen 93 displayed by the processing at step S5B of the third main processing, the CPU 301 may identify at least one of the type of the pre-treatment agent and the application amount of the pre-treatment agent, as the application information of the pre-treatment information. By doing this, the terminal device 3 can identify at least one of the type of the pre-treatment agent and the application amount of the pre-treatment agent at the timing at which the image data is received. As a result, the pre-treatment device 10 can reduce the deterioration in the productivity compared to when identifying at least one of the type of the pre-treatment agent and the application amount of the pre-treatment agent just before the pre-treatment.

When identifying the pretreatment information in the processing at step S7 on the second setting screen 92 displayed by the processing at step S5 of the first main processing, when identifying the pretreatment information in the processing at step S7 on the third setting screen 93 displayed by the processing at step S5A of the second main processing, and when identifying the pretreatment information in the processing at step S7 on the second setting screen 92 or the third setting screen 93 displayed by the processing at step S5B of the third main processing, the CPU 301 may identify at least one of the heat treatment pressure ($N/cm^2$), the heat treatment time period (sec), the heat treatment temperature (° C.), and the number of times of the heat treatment, as the heat treatment information of the pretreatment information. By doing this, the terminal device 3 can identify at least one of the heat treatment pressure (N/cm$^2$), the heat treatment time period (sec), the heat treatment temperature (° C.), and the number of times of the heat treatment at the timing at which the image data is received. As a result, the pre-treatment device 10 can reduce the deterioration in the productivity compared to when identifying at least one of the heat treatment pressure (N/cm$^2$), the heat treatment time period (sec), the heat treatment temperature (° C.), and the number of times of the heat treatment just before the pre-treatment.

The programs and the like used to execute the main processing and the like may be stored in a disk device or the like provided in a server device on the Internet, and the terminal device 3 may download various programs.

According to the embodiments or the modified examples, the terminal device 3 may use other types of storage device other than a ROM and a RAM. For example, the terminal device 3 may have a storage device, such as a content addressable memory (CAM), an SRAM, an SDRAM or the like.

According to the embodiments or the modified examples, the electrical configurations of the terminal device 3 may be different from that shown in FIG. 3. Other hardware having a standard/type other than that illustrated in FIG. 3 may be applied to the terminal device 3.

For example, the control portion of the terminal device 3 shown in FIG. 3 may be configured by a hardware circuit. Specifically, instead of the CPU 301, the control portion may be configured by a reconfigurable circuit, such as an FPGA, or an ASIC. The control portion may be configured by both the hardware circuit and the CPU 301.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A non-transitory computer-readable medium storing computer-readable instructions that, when executed by a processor of a pretreatment information generation device included in a system having the pretreatment information generation device, a pretreatment device and a printer, the pretreatment device being configured to perform pretreatment on a recording medium, the printer being configured to print an image on the recording medium, and the pretreatment information generation device being configured to generate pretreatment information to be used in the pretreatment by the pretreatment device, performs processes comprising:

receiving image data to be printed on the recording medium by the printer, the image data representing the image; and identifying the pretreatment information to perform the pretreatment with respect to the received image data, the pretreatment information including a pretreatment range over which to perform the pretreatment by the pretreatment device, the pretreatment range including at least one unit range determined by a configuration of the pretreatment device, size of the unit range being larger than a minimum image forming range to be printed by the printer, an entire range of the unit range being applied with a pretreatment agent by the pretreatment device when the image is printed by the printer on at least a part of the unit range.

2. The non-transitory computer-readable medium according to claim 1, wherein the computer-readable instructions, when executed by the processor, further performs a process comprising:

storing the identified pretreatment information and the received image data in association with each other in a storage.

3. The non-transitory computer-readable medium according to claim 2, wherein the computer-readable instructions, when executed by the processor, further performs a process comprising:

issuing an identifier, wherein the process of storing the identified pretreatment information and the received image data in association with each other in the storage includes storing, in the storage, the issued identifier in association with the pretreatment information and the image data.

4. The non-transitory computer-readable medium according to claim 1, wherein the pretreatment range covers an expanded image obtained by expanding the image represented by the received image data using a predetermined scale factor.

5. The non-transitory computer-readable medium according to claim 4, wherein the pretreatment range covers the expanded image in a rectangular shape.

6. The non-transitory computer-readable medium according to claim 1, wherein the pretreatment range includes an application range and a heat treatment range, the application range being over which to apply the pretreatment agent by an applicator of the pretreatment device, the application range including at least one unit application range, as the at least one unit range, determined by a characteristics of the applicator, the heat treatment range being over which to perform a heat treatment by a heater of the pretreatment device, and the heat treatment range including at least one unit heat treatment range, as the at least one unit range, determined by a characteristics of the heater.

7. The non-transitory computer-readable medium according to claim 6, wherein the application range includes a plurality of unit application ranges, each of the unit application ranges corresponding to each of a plurality of applicators of the pretreatment agent provided in the pretreatment device.

8. The non-transitory computer-readable medium according to claim 6, wherein the heat treatment range includes a single unit heat treatment range of the heater provided in the pretreatment device.

9. The non-transitory computer-readable medium according to claim 1, wherein the identifying the pretreatment information to perform the pretreatment with respect to the received image data includes identifying at least one of a type of the pretreatment agent and an application amount of the pretreatment agent.

10. The non-transitory computer-readable medium according to claim 1, wherein the identifying the pretreatment information to perform the pretreatment with respect to the received image data includes identifying at least one of a heat treatment pressure, a heat treatment temperature, a heat treatment time period, and a number of times of heat treatment of a heater provided in the pretreatment device.

11. The non-transitory computer-readable medium according to claim 1, wherein the computer-readable instructions, when executed by the processor, further performs a process comprising:
    second receiving at least one of material information relating to a material of the recording medium, and manufacturing information relating to manufacture, and
    identifying the pretreatment information to perform the pretreatment with respect to the received image data includes identifying the pretreatment information on a basis of at least one of the material information and the manufacturing information received in the second receiving.

12. The non-transitory computer-readable medium according to claim 6, wherein the heat treatment range includes a plurality of unit heat treatment ranges of heater provided in the pretreatment device.

13. A pretreatment information generation method of a pretreatment information generation device included in a system having the pretreatment information generation device, a pretreatment device and a printer, the pretreatment device being configured to perform pretreatment on a recording medium, the printer being configured to print an image on the recording medium, and the pretreatment information generation device being configured to generate pretreatment information to be used in pretreatment by the pretreatment device, the method comprising the steps of:
    receiving, by a controller of the pretreatment information generation device, image data to be printed on the recording medium by the printer, the image data representing the image; and
    identifying the pretreatment information to perform the pretreatment with respect to the image data received by the controller, the pretreatment information including a pretreatment range over which to perform the pretreatment by the pretreatment device, the pretreatment range including at least one unit range determined by a configuration of the pretreatment device, size of the unit range being larger than a minimum image forming range to be printed by the printer, an entire range of the unit range being applied with a pretreatment agent by the pretreatment device when the image is printed by the printer on at least a part of the unit range.

14. A system comprising:
a pretreatment device being configured to perform pretreatment on a recording medium;
a printer configured to print an image on the recording medium; and
a pretreatment information generation device, wherein the pretreatment information generation device comprises:
    a receiver configured to receive image data to be printed on the recording medium by the printer, the image data representing the image;
    a processor; and
    a memory storing computer-readable instructions that, when executed by the processor, perform processes including:
        receiving the image data; and
        identifying pretreatment information to perform the pretreatment with respect to the received image data, the pretreatment information including a pretreatment range over which to perform the pretreatment by the pretreatment device of the pretreatment device, the pretreatment range including at least one unit range determined by a configuration of the pretreatment device, size of the unit range is larger than a minimum image forming range to be printed by the printer, an entire range of the unit range being applied with a pretreatment agent by the pretreatment device when the image is printed by the printer on at least a part of the unit range.

* * * * *